US008824242B2

(12) United States Patent
Lee

(10) Patent No.: US 8,824,242 B2
(45) Date of Patent: Sep. 2, 2014

(54) METHODS, SYSTEMS, AND APPARATUS TO CALCULATE DISTANCE FROM AUDIO SOURCES

(75) Inventor: Morris Lee, Palm Harbor, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 383 days.

(21) Appl. No.: 13/043,025

(22) Filed: Mar. 8, 2011

(65) Prior Publication Data
US 2011/0222373 A1    Sep. 15, 2011

Related U.S. Application Data

(60) Provisional application No. 61/311,893, filed on Mar. 9, 2010.

(51) Int. Cl.
*G01S 3/80* (2006.01)
*G01S 5/18* (2006.01)
*H04N 21/442* (2011.01)
*G01S 11/14* (2006.01)

(52) U.S. Cl.
CPC ............ *H04N 21/44218* (2013.01); *G01S 5/18* (2013.01); *G01S 11/14* (2013.01)
USPC .............................................. 367/124; 367/95

(58) Field of Classification Search
CPC ........ G01S 11/14; G01S 15/12; G01S 3/8083
USPC ............................................ 367/95, 124, 127
See application file for complete search history.

(56) References Cited

U.S. PATENT DOCUMENTS

| | | |
|---|---|---|
| 2,903,508 A | 9/1959 | Hathaway |
| 3,056,135 A | 9/1962 | Currey et al. |

(Continued)

FOREIGN PATENT DOCUMENTS

| | | |
|---|---|---|
| EP | 0 946 012 | 9/1999 |
| EP | 1 133 090 | 9/2000 |

(Continued)

OTHER PUBLICATIONS

Wagner, David P. Battelle. Report: Lexington Area Travel Data Collection Test; GPS for Personal Travel Surveys. Final Report for Office of Highway Information Management, Office of Technology Application, and Federal Highway Administration, Sep. 1997, (92 pages).

(Continued)

*Primary Examiner* — Isam Alsomiri
*Assistant Examiner* — Hovhannes Baghdasaryan
(74) *Attorney, Agent, or Firm* — Hanley, Flight and Zimmerman, LLC

(57) ABSTRACT

Systems, methods, articles of manufacture and apparatus are disclosed to calculate distance from audio sources. An example method disclosed herein includes receiving, at the reference audio collecting device, a first radio frequency (RF) signal from the portable audio collecting device, in response to receiving the RF signal, storing ambient audio to a memory as reference data samples, each of the reference data samples associated with an indication of a respective time of acquisition, and receiving a second RF signal containing portable data samples of the ambient audio, each of the portable data samples associated with an indication of a respective time of acquisition. The example method also includes computing a correlation value between a set of the portable data samples and a plurality of the reference data samples, selecting a set of samples having a highest correlation value, subtracting the indication of times of the pair of samples to form a difference value, and calculating a distance between the portable audio device and the reference audio collecting device based on the difference value.

25 Claims, 15 Drawing Sheets

(56) References Cited

U.S. PATENT DOCUMENTS

| | | |
|---|---|---|
| 4,107,734 A | 8/1978 | Percy et al. |
| 4,382,291 A | 5/1983 | Nakauchi |
| 4,574,304 A | 3/1986 | Watanabe et al. |
| 4,605,958 A | 8/1986 | Machnik et al. |
| 4,626,904 A | 12/1986 | Lurie |
| 4,644,509 A | 2/1987 | Kiewit et al. |
| 4,695,879 A | 9/1987 | Weinblatt |
| 4,718,106 A | 1/1988 | Weinblatt |
| 4,740,792 A | 4/1988 | Sagey et al. |
| 4,769,697 A | 9/1988 | Gilley et al. |
| 4,779,198 A | 10/1988 | Lurie |
| 4,930,011 A | 5/1990 | Kiewit |
| 4,955,000 A | 9/1990 | Nastrom |
| 4,972,471 A | 11/1990 | Gross et al. |
| 4,972,503 A | 11/1990 | Zurlinden |
| 4,990,892 A | 2/1991 | Guest et al. |
| 5,029,183 A | 7/1991 | Tymes |
| 5,119,104 A | 6/1992 | Heller |
| 5,146,231 A | 9/1992 | Ghaem et al. |
| 5,226,090 A | 7/1993 | Kimura |
| 5,226,177 A | 7/1993 | Nickerson |
| 5,245,664 A * | 9/1993 | Kinoshite et al. ............ 381/71.4 |
| 5,280,498 A | 1/1994 | Tymes et al. |
| 5,285,498 A | 2/1994 | Johnston |
| 5,294,981 A | 3/1994 | Yazolino et al. |
| 5,382,970 A | 1/1995 | Kiefl |
| 5,387,993 A | 2/1995 | Heller et al. |
| 5,404,377 A | 4/1995 | Moses |
| 5,428,821 A | 6/1995 | Krisna et al. |
| 5,442,343 A | 8/1995 | Cato et al. |
| 5,457,807 A | 10/1995 | Weinblatt |
| 5,473,631 A | 12/1995 | Moses |
| 5,481,294 A | 1/1996 | Thomas et al. |
| 5,483,276 A | 1/1996 | Brooks et al. |
| 5,550,928 A | 8/1996 | Lu et al. |
| 5,574,962 A | 11/1996 | Fardeau et al. |
| 5,579,124 A | 11/1996 | Aijala et al. |
| 5,581,800 A | 12/1996 | Fardeau et al. |
| 5,629,739 A | 5/1997 | Dougherty |
| 5,630,203 A | 5/1997 | Weinblatt |
| 5,640,144 A | 6/1997 | Russo et al. |
| 5,646,675 A | 7/1997 | Copriviza et al. |
| 5,692,215 A | 11/1997 | Kutzik et al. |
| 5,774,876 A | 6/1998 | Woolley et al. |
| 5,787,334 A | 7/1998 | Fardeau et al. |
| 5,793,409 A | 8/1998 | Tetsumura |
| 5,805,983 A | 9/1998 | Naidu et al. |
| 5,812,930 A | 9/1998 | Zavrel |
| 5,815,114 A | 9/1998 | Speasl et al. |
| 5,839,050 A | 11/1998 | Baehr et al. |
| 5,872,588 A | 2/1999 | Aras et al. |
| 5,884,278 A | 3/1999 | Powell |
| 5,893,093 A | 4/1999 | Wills |
| 5,982,808 A | 11/1999 | Otto |
| 6,002,918 A | 12/1999 | Heiman et al. |
| 6,014,102 A | 1/2000 | Mitzlaff et al. |
| 6,035,177 A | 3/2000 | Moses et al. |
| 6,091,956 A | 7/2000 | Hollenberg |
| 6,098,048 A | 8/2000 | Dashefsky et al. |
| 6,243,739 B1 | 6/2001 | Schwartz et al. |
| 6,252,522 B1 | 6/2001 | Hampton et al. |
| 6,272,176 B1 | 8/2001 | Srinivasan |
| 6,359,557 B2 | 3/2002 | Bilder |
| 6,380,988 B1 | 4/2002 | Sung |
| 6,396,413 B2 | 5/2002 | Hines et al. |
| 6,421,445 B1 | 7/2002 | Jensen et al. |
| 6,424,264 B1 | 7/2002 | Giraldin et al. |
| 6,430,498 B1 | 8/2002 | Maruyama et al. |
| 6,433,689 B1 | 8/2002 | Hovind et al. |
| 6,467,089 B1 | 10/2002 | Aust et al. |
| 6,470,264 B2 | 10/2002 | Bide |
| 6,484,316 B1 | 11/2002 | Lindberg |
| 6,487,719 B1 | 11/2002 | Itoh et al. |
| 6,493,649 B1 | 12/2002 | Jones et al. |
| 6,497,658 B2 | 12/2002 | Roizen et al. |
| 6,563,423 B2 | 5/2003 | Smith |
| 6,563,430 B1 | 5/2003 | Kemink et al. |
| 6,577,238 B1 | 6/2003 | Whitesmith et al. |
| 6,647,548 B1 | 11/2003 | Lu et al. |
| 6,654,800 B1 | 11/2003 | Rieger, III |
| 6,662,137 B2 | 12/2003 | Squibbs |
| 6,731,942 B1 | 5/2004 | Nageli |
| 6,748,317 B2 | 6/2004 | Maruyama et al. |
| 6,766,524 B1 | 7/2004 | Matheny et al. |
| 6,842,877 B2 | 1/2005 | Robarts et al. |
| 6,882,837 B2 | 4/2005 | Fernandez et al. |
| 6,888,457 B2 | 5/2005 | Wilkinson et al. |
| 6,898,434 B2 | 5/2005 | Pradhan et al. |
| 6,919,803 B2 | 7/2005 | Breed |
| 6,928,280 B1 | 8/2005 | Xanthos et al. |
| 6,928,367 B2 * | 8/2005 | Gray et al. ..................... 702/11 |
| 6,934,508 B2 | 8/2005 | Ceresoli et al. |
| 6,940,403 B2 | 9/2005 | Kail, IV |
| 6,958,710 B2 | 10/2005 | Zhang et al. |
| 6,967,674 B1 | 11/2005 | Lausch |
| 6,970,131 B2 | 11/2005 | Percy et al. |
| 7,038,619 B2 | 5/2006 | Percy et al. |
| 7,039,098 B2 | 5/2006 | Younis |
| 7,046,162 B2 | 5/2006 | Dunstan |
| 7,076,441 B2 | 7/2006 | Hind et al. |
| 7,080,061 B2 | 7/2006 | Kabala |
| 7,099,676 B2 | 8/2006 | Law et al. |
| 7,126,454 B2 | 10/2006 | Bulmer |
| 7,148,803 B2 | 12/2006 | Bandy et al. |
| 7,155,159 B1 | 12/2006 | Weinblatt et al. |
| 7,171,331 B2 | 1/2007 | Vock et al. |
| 7,222,071 B2 | 5/2007 | Neuhauser et al. |
| 7,242,910 B2 | 7/2007 | Peterson, III et al. |
| 7,295,108 B2 | 11/2007 | Corrado et al. |
| 7,354,400 B2 * | 4/2008 | Asafusa et al. ............... 600/437 |
| 7,359,408 B2 | 4/2008 | Kim |
| 7,363,028 B2 | 4/2008 | de Clerq et al. |
| 7,460,827 B2 | 12/2008 | Schuster et al. |
| 7,463,143 B2 | 12/2008 | Forr et al. |
| 7,471,987 B2 | 12/2008 | Crystal et al. |
| 7,483,975 B2 | 1/2009 | Kolessar et al. |
| 2002/0068556 A1 | 6/2002 | Brown |
| 2002/0085627 A1 | 7/2002 | Younis |
| 2002/0144259 A1 | 10/2002 | Gutta et al. |
| 2002/0150387 A1 | 10/2002 | Kunii et al. |
| 2002/0174425 A1 | 11/2002 | Markel et al. |
| 2002/0198762 A1 | 12/2002 | Donato |
| 2003/0033600 A1 | 2/2003 | Cliff et al. |
| 2003/0046685 A1 | 3/2003 | Srinivasan et al. |
| 2003/0070182 A1 | 4/2003 | Pierre et al. |
| 2003/0093784 A1 | 5/2003 | Dimitrova et al. |
| 2003/0097302 A1 | 5/2003 | Overhultz et al. |
| 2003/0122708 A1 | 7/2003 | Percy et al. |
| 2003/0126593 A1 | 7/2003 | Mault |
| 2003/0136827 A1 | 7/2003 | Kaneko et al. |
| 2003/0146871 A1 | 8/2003 | Karr et al. |
| 2003/0171833 A1 | 9/2003 | Crystal et al. |
| 2003/0177488 A1 | 9/2003 | Smith et al. |
| 2003/0194004 A1 | 10/2003 | Srinivasan |
| 2003/0208754 A1 | 11/2003 | Sridhar et al. |
| 2003/0222819 A1 | 12/2003 | Karr et al. |
| 2003/0222820 A1 | 12/2003 | Karr et al. |
| 2004/0003073 A1 | 1/2004 | Krzyzanowski et al. |
| 2004/0019463 A1 | 1/2004 | Kolessar et al. |
| 2004/0019675 A1 | 1/2004 | Hebeler, Jr. et al. |
| 2004/0025174 A1 | 2/2004 | Cerrato |
| 2004/0027271 A1 | 2/2004 | Schuster et al. |
| 2004/0037436 A1 * | 2/2004 | Rui .............................. 381/92 |
| 2004/0095276 A1 | 5/2004 | Krumm et al. |
| 2004/0122679 A1 | 6/2004 | Neuhauser et al. |
| 2004/0190730 A1 * | 9/2004 | Rui et al. ...................... 381/92 |
| 2004/0198386 A1 | 10/2004 | Dupray |
| 2004/0266457 A1 | 12/2004 | Dupray |
| 2005/0035857 A1 | 2/2005 | Zhang et al. |
| 2005/0125820 A1 | 6/2005 | Nelson et al. |
| 2005/0141345 A1 | 6/2005 | Holm et al. |
| 2005/0144632 A1 | 6/2005 | Mears et al. |
| 2005/0172311 A1 | 8/2005 | Hjelt et al. |
| 2005/0200476 A1 | 9/2005 | Forr et al. |

(56) References Cited

U.S. PATENT DOCUMENTS

| | | | |
|---|---|---|---|
| 2005/0201826 | A1 | 9/2005 | Zhang et al. |
| 2005/0203798 | A1 | 9/2005 | Jensen et al. |
| 2005/0204379 | A1 | 9/2005 | Yamamori |
| 2005/0207592 | A1 | 9/2005 | Sporer et al. |
| 2005/0216509 | A1 | 9/2005 | Kolessar et al. |
| 2005/0234774 | A1 | 10/2005 | Dupree |
| 2005/0243784 | A1 | 11/2005 | Fitzgerald et al. |
| 2005/0264430 | A1 | 12/2005 | Zhang et al. |
| 2005/0265562 | A1* | 12/2005 | Rui ............... 381/92 |
| 2006/0053110 | A1 | 3/2006 | McDonald et al. |
| 2006/0075421 | A1 | 4/2006 | Roberts et al. |
| 2006/0168613 | A1 | 7/2006 | Wood et al. |
| 2006/0202973 | A1* | 9/2006 | Kobayashi et al. ........ 345/173 |
| 2007/0011040 | A1 | 1/2007 | Wright et al. |
| 2007/0159924 | A1* | 7/2007 | Vook et al. ............. 367/127 |
| 2007/0288277 | A1 | 12/2007 | Neuhauser et al. |
| 2007/0288476 | A1 | 12/2007 | Flanagan, III et al. |
| 2007/0294057 | A1 | 12/2007 | Crystal et al. |
| 2007/0294132 | A1 | 12/2007 | Zhang et al. |
| 2007/0294705 | A1 | 12/2007 | Gopalakrishnan et al. |
| 2007/0294706 | A1 | 12/2007 | Neuhauser et al. |
| 2008/0086533 | A1 | 4/2008 | Neuhauser et al. |
| 2008/0091087 | A1 | 4/2008 | Neuhauser et al. |
| 2008/0091451 | A1 | 4/2008 | Crystal |
| 2008/0091762 | A1 | 4/2008 | Neuhauser et al. |
| 2008/0101454 | A1 | 5/2008 | Luff et al. |
| 2008/0109295 | A1 | 5/2008 | McConochie et al. |
| 2008/0204273 | A1 | 8/2008 | Crystal et al. |
| 2009/0180351 | A1* | 7/2009 | Paffenholz et al. ............. 367/38 |
| 2009/0262137 | A1* | 10/2009 | Walker et al. ............... 345/629 |
| 2010/0111311 | A1* | 5/2010 | Yamakawa et al. ........... 381/17 |
| 2010/0268540 | A1 | 10/2010 | Arshi et al. |
| 2010/0268573 | A1 | 10/2010 | Jain et al. |
| 2011/0182148 | A1* | 7/2011 | Radusch et al. ............. 367/127 |

FOREIGN PATENT DOCUMENTS

| | | |
|---|---|---|
| GB | 2260246 | 7/1993 |
| GB | 2292506 | 2/1996 |
| JP | 2000307530 | 11/2000 |
| WO | 9111062 | 7/1991 |
| WO | 9411989 | 5/1994 |
| WO | 9731440 | 8/1997 |
| WO | WO 99/55057 | 10/1999 |
| WO | 0131816 | 5/2001 |
| WO | 03/077455 | 9/2003 |
| WO | WO03/087871 | 10/2003 |
| WO | WO 2004/051303 | 6/2004 |
| WO | WO 2004/051304 | 6/2004 |
| WO | WO2006/037014 | 4/2006 |
| WO | 2006096177 | 9/2006 |

OTHER PUBLICATIONS

Bahl et al., "A Software System for Locating Mobile Users: Design, Evaluation, and Lessons", Technical Report MSRTR-2000-12 Microsoft Research, [retrieved from internet, http://research.microsoft.com/~bahl/Papers/Pdf/radar.pdf],Feb. 2000 (13 pages).

United States Patent and Trademark Office, Office Action issued in connection with U.S. Appl. No. 11/692,087, dated Oct. 30, 2009, 38 pages.

United States Patent and Trademark Office, Office Action issued in connection with U.S. Appl. No. 11/692,087, dated May 13, 2009, 14 pages.

International Searching Authority, International Search Report and Written Opinion issued in connection with International Application PCT/US05/23478, mailed on Jan. 23, 2006, 9 pages.

International Searching Authority, International Search Report and Written Opinion issued in connection with International Application PCT/US05/34743, mailed Oct. 31, 2006, 12 pages.

International Searching Authority, International Preliminary Report on Patentability issued in connection with International Application PCT/US05/34743, mailed Oct. 31, 2006, 9 pages.

Fang et al., "Design of a Wireless Assisted Pedestrian Dead Reckoning System—The NavMote Experience," vol. 54, Issue 6, Institute of Electrical and Electronics Engineers (IEEE), Dec. 2005 (16 pages).

Bernstein et al., "An Introduction to Map Matching for Personal Navigation Assistants," New Jersey Tide Center, New Jersey Institute of Technology, Aug. 1996 (17 pages).

Kerschbaumer, Ken, "Who's Really Watching? How Cable's Digital Box Will Rock the Ratings World," Reed Business Information, a Division of Reed Elsevier, Inc., May 16, 2005 (4 pages).

McCarthy et al., "RF Free Ultrasonic Positioning," Department of Computer Science, University of Bristol, U.K., 2003 (7 pages).

McCarthy et al., "RF Free Ultrasonic Positioning (Presentation)," 7$^{th}$ International Symposiom on Wearable Computers, Oct. 2003 (12 pages).

Gentile et al., "Robust Location using System Dynamics and Motion Constraints," National Institute of Standards and Technology, Wireless Communication Technologies Group, Jun. 24, 2004 (5 pages).

Cricket Project, "Cricket v2 User Manual," MIT Computer Science and Artificial Intelligence Lab, Cambridge, U.S.A., Jan. 2005 (57 pages).

Holm, Sverre, "Technology Presentation," [online]. Sonitor Technologies, May 26, 2004 [retrieved on Oct. 13, 2004]. Retrieved from the Internet: <URL: www.sonitor.com/news/article.asp?id=62> (16 pages).

"The Nibble Location System," [online]. UCLA, May 21, 2001 [retrieved on Nov. 2, 2004]. Retrieved from the Internet: <URL: http://mmsl.cs.ucla.edu/nibble/>. (13 pages).

"New Sonitor Patent Combines Ultrasound and RFID," [online]. Sonitor Technologies, Feb. 17, 2005 [retrieved on Jun. 13, 2005]. Retrieved from the Internet: <URL: http://sonitor.com/news/article.asp?id=73>. (1 page).

"NIST Location System," [online]. Wireless Communication Technologies Group, National Institute of Standards and Technology, Mar. 12, 2004 [retrieved in Nov. 1, 2004]. Retrieved from the Internet: <URL: www.antd.nist.gov>. (2 pages).

Ferguson, Michael. "XTension Tech Notes," [online]. Sand Hill Engineering Inc., Dec. 10, 1998 [retrieved in Jan. 12, 2004]. Retrieved from the Internet: <URL: http://www.shed.com/articles/TN.proximity.html >. (9 pages).

"FM Wireless Microphone Module Kits," [online]. Horizon Industries, 2004 [retrieved on Sep. 30, 2004]. Retrieved from the Internet: <URL: www.horizonindustries.com/fm.htm>. (1 page).

"Arkon Sound Feeder II FM Transmitter," [online]. Yahoo Shopping, 2002 [retrieved on Sep. 29, 2004]. Retrieved from the Internet: <URL: http://store.yahoo.com/semsons-inc/arsoundfeedii.html>. (2 pages).

"Dust Networks—SmartMesh," [online]. Dust Networks Inc., 2002 [retrieved on Sep. 29, 2004]. Retrieved from the Internet: <URL: www.dustnetworks.com>. (2 pages).

Kanellos, Michael. "Dust Makes Mesh of Wireless Sensors," [online]. CNET News.com, Sep. 20, 2004 [retrieved on Sep. 29, 2004]. Retrieved from the Internet: <URL: http://www.news.com/Dust-makes-mesh-of-wireless-sensors/2100-1008_3-5374971.html?tag=item>. (2 pages).

"UHF Radio Data Logging System—GenII Data Logger," [online]. Amplicon, 2004 [retrieved on Sep. 29, 2004]. Retrieved from the Internet: <URL: www.amplicon.co.uk/dr-prod3.cfm/subsecid/10037/secid/1/groupid/11809.htm>. (3 pages).

"Eltek GenII Radio Data Logging System," [online]. Eltek Ltd., 2004 [retrieved on Sep. 29, 2004]. Retrieved from the Internet: <URL: www.elteckdataloggers.co.uk>. (4 pages).

"World's Smallest Hands Free Radio," [online]. Yahoo Shopping, 2004 [retrieved on Sep. 29, 2004]. Retrieved from the Internet: <URL: http://store.yahoo.com/latesttrends/worsmalhanfr.html>. (1 page).

"American Technology Corporation—Retailer Ads—AM & FM Sounds," [online]. Woody Norris, May 4, 2004 [retrieved on Sep. 29, 2004]. Retrieved from the Internet: <URL: www.woodynorris.com>. (3 pages).

"X1 Button Radio—The World's Smallest Radio," [online]. Exxun, 2004 [retrieved on Sep. 29, 2004]. Retrieved from the Internet: <URL: www.exxun.com>. (2 pages).

(56) References Cited

OTHER PUBLICATIONS

"Discovery Spy Motion Tracking System," [online]. Discovery Communications Inc., 2004 [retrieved on Sep. 14, 2004]. Retrieved from the Internet: <URL: http://shopping.discovery.com/stores/servlet/ProductDisplay?catalogId=10000& storeId=10000&lanlan=-1&productId=53867&partnumber=689638>. (3 pages).

Schuman, Evan. "Smarter Smart Cart?" [online]. Storefront Backtalk, Feb. 16, 2005 [retrieved on Nov. 20, 2006]. Retrieved from the Internet: <URL: www.storefrontbacktalk.com>. (5 pages).

"Arbitron & Scarborough Unveil New Mall Shopper Audience Measurement," [online]. Streamline Media Inc., Jun. 22, 2007 [retrieved in 2007]. Retrieved from the Internet: <URL: www.radioink.com>. (2 pages).

"University Library Navigation Enabled by Ekahau," [online]. Directions Magazine, Jun. 12, 2003 [Aug. 3, 2007]. Retrieved from the Internet: <URL: http://www/directionsmag.com/press.releases/index.php?duty=Show&id=7276&trv=1>. (3 pages).

Patent Cooperation Treaty Search Report mailed Oct. 31, 2006 in corresponding PCT application No. PCT/US05/34743, filed Sep. 27, 2005, 4 pages.

Patent Cooperation Treaty Search Opinion mailed Oct. 31, 2006 in corresponding PCT application No. PCT/US05/34743, filed Sep. 27, 2005, 9 pages.

Yeung, K.L., & Yum, T.-S.P. "A Comparative Study on Location Tracking Strategies in Cellular Mobile Radio Systems," Global Telecommunications Conference 1995. Globecom '95, IEEE Nov. 14-26, 1995 (pp. 22-28 vol. 1).

Handy et al., "Lessons Learned from Developing a Bluetooth Multiplayer-Game," 2nd International Conference on Pervasive Computing, Workshop on Gaming, [retrieved from internet, http://www.ipsi.fraunhofer.de/ambiente/pervasivegaming/papers/Handy_Pervasive2004.pdf] (pp. 7).

Battiti, Roberto, et al. "Location-Aware Computing: a Neutral Network Model for Determining Location in Wireless LANS" University of Trento: Department of Information and Communication Technology, Technical Report #DIT-02-0083, Feb. 2002 (pp. 1-16).

Azondekon et al., "Service Selection in Networks Based on Proximity Confirmation Using Infrared", http://www.scs.carleton.ca/~barbeau/Publications/2002/azondekon.pdf, International Conference on Telecommunications (ICT) Beijing, 2002 (5 pages).

Patent Cooperation Treaty, International Preliminary Examination Report, issued by the International Bureau in connection with PCT application No. PCT/US02/12333, mailed Oct. 20, 2005 (3 pages).

Patent Cooperation Treaty, International Search Report, issued by the International Searching Authority in connection with PCT application No. PCT/US02/12333, mailed Jul. 4, 2003 (2 pages).

Canadian Intellectual Property Office, Notice of Allowance, issued in connection with Canadian Patent Application No. 2,581,982, on Jan. 14, 2013 (1 page).

European Patent Office, Extended European Search Report, issued in connection with European Patent Application No. 05798935.3, on May 3, 2012 (7 pages).

United States Patent and Trademark Office, Non-Final Office Action, issued in connection with U.S. Appl. No. 10/125,577, on Jan. 17, 2003 (7 pages).

United States Patent and Trademark Office, Non-Final Office Action, issued in connection with U.S. Appl. No. 10/125,577, on Jul. 2, 2003 (7 pages).

United States Patent and Trademark Office, Final Office Action, issued in connection with U.S. Appl. No. 10/125,577, on Jan. 5, 2004 (10 pages).

United States Patent and Trademark Office, Notice of Allowance, issued in connection with U.S. Appl. No. 10/125,577, on Apr. 1, 2004 (12 pages).

United States Patent and Trademark Office, Non-Final Office Action, issued in connection with U.S. Appl. No. 11/037,277, on Apr. 20, 2007 (6 pages).

United States Patent and Trademark Office, Notice of Allowance, issued in connection with U.S. Appl. No. 11/037,277, on Nov. 1, 2007 (6 pages).

United States Patent and Trademark Office, Notice of Allowance, issued in connection with U.S. Appl. No. 11/692,087, on Jan. 12, 2010 (8 pages).

United States Patent and Trademark Office, Non-Final Office Action, issued in connection with U.S. Appl. No. 12/757,755, on Sep. 20, 2010 (10 pages).

United States Patent and Trademark Office, Final Office Action, issued in connection with U.S. Appl. No. 12/757,755, on Mar. 28, 2011 (11 pages).

\* cited by examiner

770

| TIME UNIT 772 | CORRELATION VALUE 774 |
|---|---|
| 80 | 0.348802 |
| 81 | 0.349169 |
| 82 | 0.348064 |
| 83 | 0.349381 |
| 84 | 0.349336 |
| 85 | 0.349706 |
| 86 | 0.350163 |
| 87 | 0.349362 |
| 88 | 0.349776 |
| 89 | 0.349906 |
| 90 | 0.352142 |
| 91 | 0.351807 |
| 92 | 0.352578 |
| 93 | 0.352820 ← Local Maximum |
| 94 | 0.352296 |
| 95 | 0.350131 |
| 96 | 0.349034 |
| 97 | 0.349789 |
| 98 | 0.348669 |
| 99 | 0.348929 |
| 100 | 0.351478 |
| 101 | 0.350873 |
| 102 | 0.351794 |

| TIME UNIT (802) | CORRELATION VALUE (804) | |
|---|---|---|
| 80 | 0.348802 | |
| 81 | 0.349169 | |
| 82 | 0.348064 | |
| ... | ... | |
| 92 | 0.352578 | |
| 93 | 0.352820 | ← Local Maximum |
| 94 | 0.352296 | |
| ... | ... | |
| 165 | 0.365142 | |
| 166 | 0.365924 | |
| 167 | 0.367321 | |
| 168 | 0.368839 | ← Local Maximum |
| 169 | 0.367389 | |
| 170 | 0.367002 | |
| 171 | 0.364646 | |
| 172 | 0.363042 | |
| 173 | 0.362691 | |
| 174 | 0.361843 | |
| 175 | 0.359432 | |
| 176 | 0.360388 | |
| 177 | 0.362460 | |
| 178 | 0.363344 | |
| 179 | 0.363111 | |
| 180 | 0.362587 | |

FIG. 8

METHODS, SYSTEMS, AND APPARATUS TO CALCULATE DISTANCE FROM AUDIO SOURCES

RELATED APPLICATION

This patent claims the benefit of U.S. Provisional Patent Application Ser. No. 61/311,893, which was filed on Mar. 9, 2010, and is hereby incorporated herein by reference in its entirety.

FIELD OF THE DISCLOSURE

This disclosure relates generally to market research and, more particularly, to methods, systems, and apparatus to calculate distance from audio sources.

BRIEF DESCRIPTION OF THE DRAWINGS

FIGS. 7D and 8 illustrate example lists of correlation values calculated by the system of FIG. 1.

BACKGROUND

Figure 1:
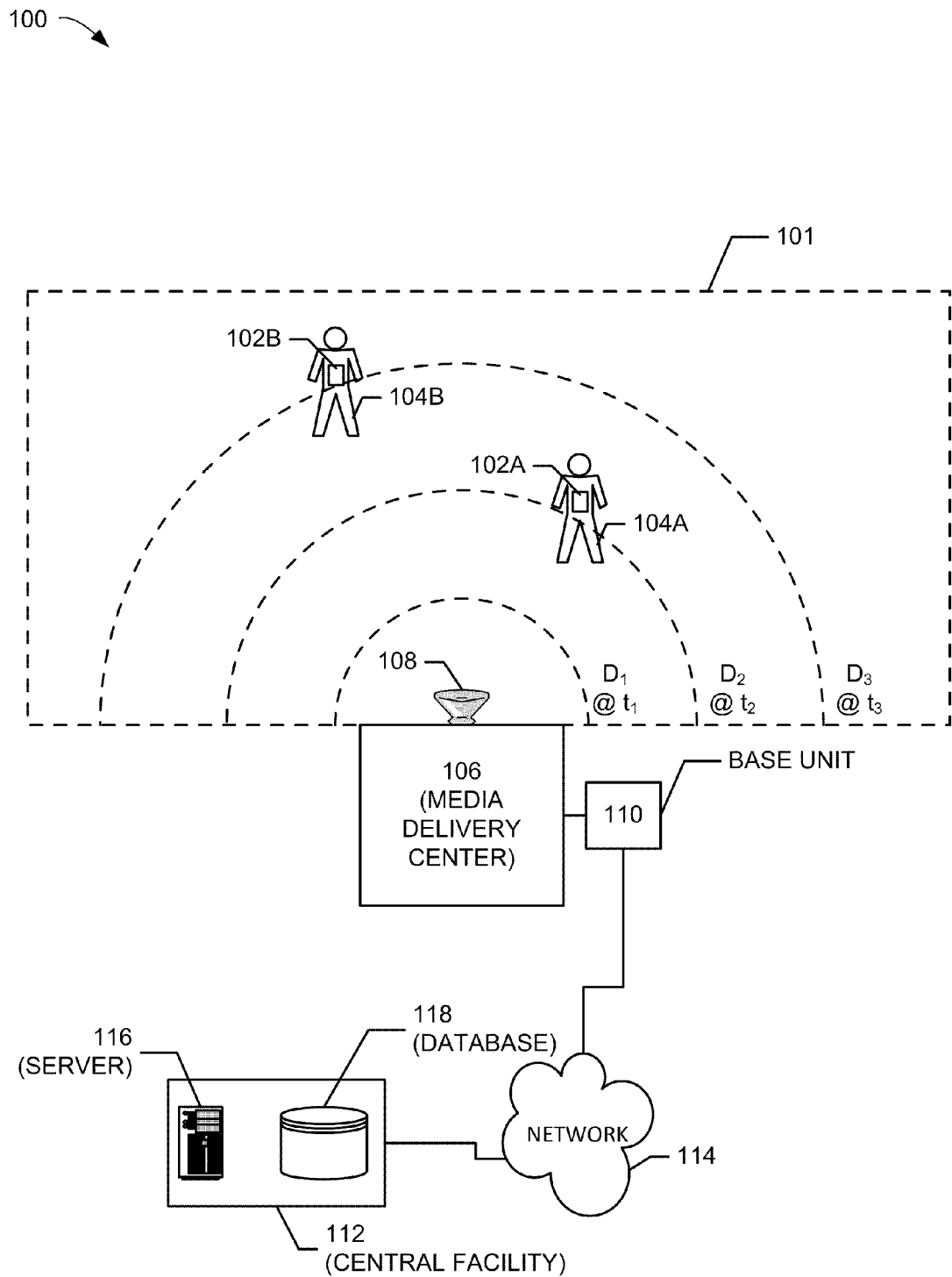
FIG. 1 is a schematic illustration of an example system to calculate distance from an audio source.

Audience measurement activities occur in consumer households, shopping areas (e.g., stores, malls, etc.), and other areas where people may be exposed to advertisements and/or other media. To identify when a consumer was exposed to media content, what the media content contains and/or where the exposure to the media occurred, the consumer may be equipped with a mobile unit to record portions of the media content exposed to the consumer.

In some examples, the consumer is equipped with a mobile unit to record audio that may be present in an area to be monitored. Presented or rendered media, such as an advertisement or a kiosk feature presentation (e.g., at a library, a museum, an amusement park, etc.) may be presented in proximity to a base unit that can also collect audio information (e.g., a portion of presented media content). When both the mobile unit and the base unit collect audio information, one or more post-processing activities may be employed to match the collected mobile unit audio information with the collected base unit information, thereby allowing identification of consumer location and/or the type of media content to which the consumer was exposed.

DETAILED DESCRIPTION

Although the following discloses example methods, systems, apparatus and articles of manufacture including, among other components, software executed on hardware, it should be noted that such methods, systems, apparatus and articles of manufacture are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods, systems, apparatus and articles of manufacture, such examples are provided are not the only way to implement the methods and apparatus described herein.

The example methods, systems, apparatus and articles of manufacture described herein may be used to analyze the movements of audience members in the course of their exposure to media sources or media presentations to aid in determining whether such media presentations were actually consumed (e.g., viewed, listened to, etc.) by the audience members. In some example implementations, the audience members may be panelist members that are statistically selected to participate in a market research study. However, in other example implementations, the audience members need not be panelist members. While mere proximity to media sources reflects an audience member's exposure, determining whether the audience member was paying attention to, consumed, and/or was engaged with such media sources requires more than proximity. For example, knowledge of an audience member's location being 5-feet from a media source (e.g., television) at one moment in time indicates exposure. However, such an audience member detected 5-feet from the media source for several moments in time (e.g., over a span of 30 minutes) indicates that the audience member may be consuming (e.g., engaged-with, paying attention to, etc.) the media presentation. Accordingly, location determination allows valuable audience member data to be collected so that media exposure and/or consumption behavior may be determined.

In particular, the example methods, systems, apparatus and articles of manufacture described herein may be implemented using, for example, tags worn or carried by audience members, and may be used to collect audience member movement information and/or media exposure information. Additionally, the movement and/or exposure information may be detected relative to media sources (e.g., a set-top box, television, stereo, an in-store display, an amusement park kiosk, a billboard, etc.) and used to determine the behavior of an audience member to thereby enable an inference as to whether the audience member is consuming media presentations. In this manner, media presentations (e.g., audio, video, still images, Internet information, computer information, billboards, etc.) may be given appropriate media consumption credit.

Turning to FIG. 1, for purposes of clarity and efficiency the example tag distance calculation system 100 and corresponding methods, apparatus and articles of manufacture are described herein with respect to an example area 101. The example area 101 may include, but is not limited to a household room, a retail establishment, a shopping mall, a street area and/or an amusement park. Information about an audience member's behavior may be determined/estimated using location information relative to a media source and/or audience member motion information. Location information may include, for example, position information that, when analyzed, may be used to determine the movements of a person or an audience member from one location to another. Location information may also include distances between an audience member and a media source, such as, for example, a home entertainment center, television, and/or a set-top box (STB) that resides in a household. Example location detection devices described below may be worn or otherwise carried by a person or audience member.

The example area 101, in which the example methods, systems, apparatus and articles of manufacture of the present disclosure may operate, includes example tags 102A, 102B worn by respective audience members 104A, 104B. Tags may include, but are not limited to, bracelets, necklaces, broaches, pendants, belt attachment(s) and/or other relatively small and/or unobtrusive battery powered devices carried by the audience members. The example area 101 also includes an example media delivery center 106 to generate media audio signals from one or more speakers 108. The example media delivery center 106 may include one or more media delivery devices (e.g., a television, a radio, etc.) and/or one or more media playback device(s) (e.g., a DVD player, a VCR, a video game console, etc.). In the illustrated example of FIG. 1, audio signals emitted from the one or more speakers 108 propagate throughout the area 101. Generally speaking, the speed at which the audio signals propagate is dependent upon atmospheric conditions including air temperature and humidity and will be assumed herein to be 13,041.6 inches per second (331.25 meters per second). In the event the example speaker 108 emits a sound at time zero ($t_0$), the emitted sound will reach a distance $D_1$ at a first time ($t_1$). Similarly, the emitted sound will continue to propagate to distances $D_2$ and $D_3$ at corresponding times $t_2$ and $t_3$.

The example area 101 also includes one or more base units 110. The base unit 110 may interact with the tags 102 for battery charging and/or data transfer operations, as discussed in further detail below. Additionally, the base unit 110 of the illustrated example is configured to work cooperatively with the tags 102 to substantially continuously generate location information of the audience members 104A, 104B relative to the location of the example media delivery center 106 as the audience member 104 moves among areas within, around, and/or outside the example area 101. The base unit 110 of the illustrated example is configured primarily as a stationary device disposed on or near the media delivery center 106 to perform one or more media (e.g., television, radio, Internet, etc.) metering methods. Depending on the types of metering that the base unit 110 (also referred to as a "set meter") is adapted to perform, the base unit 110 may be physically coupled to the media delivery center 106 or may instead be configured to capture signals emitted externally by the media delivery center 106 (e.g., audio emitted from the example speaker 108) such that direct physical coupling to the media delivery center 106 is not employed.

In the illustrated example, information collected by the base unit 110 and/or the tags 102 is provided to a central facility 112. In the example of FIG. 1, a network 114 is employed to transfer data to/from the example central facility 112. The network 114 may be implemented using any suitable communication system including, for example, a telephone system, a cable system, a satellite system, a cellular communication system, AC power lines, a network, the Internet, etc. The example central facility 112 of FIG. 1 is remotely located from the area 101 and is communicatively coupled to the base unit 110 via the network 114. The central facility 112 may obtain media exposure data, consumption data, media monitoring data, location information, motion information, and/or any other monitoring data that is collected by one or more media monitoring devices such as, for example, the tags 102.

In an example implementation, the central facility 112 includes a server 116 and a database 118. The database 118 may be implemented using any suitable memory and/or data storage apparatus and techniques. The server 116 may be implemented using, for example, a processor system similar or identical to the example processor system P100 depicted in FIG. 12. In the illustrated example, the server 116 is configured to store information collected from the tags 102 and/or base units 110 in the database 118 and to analyze the information.

Figure 2:
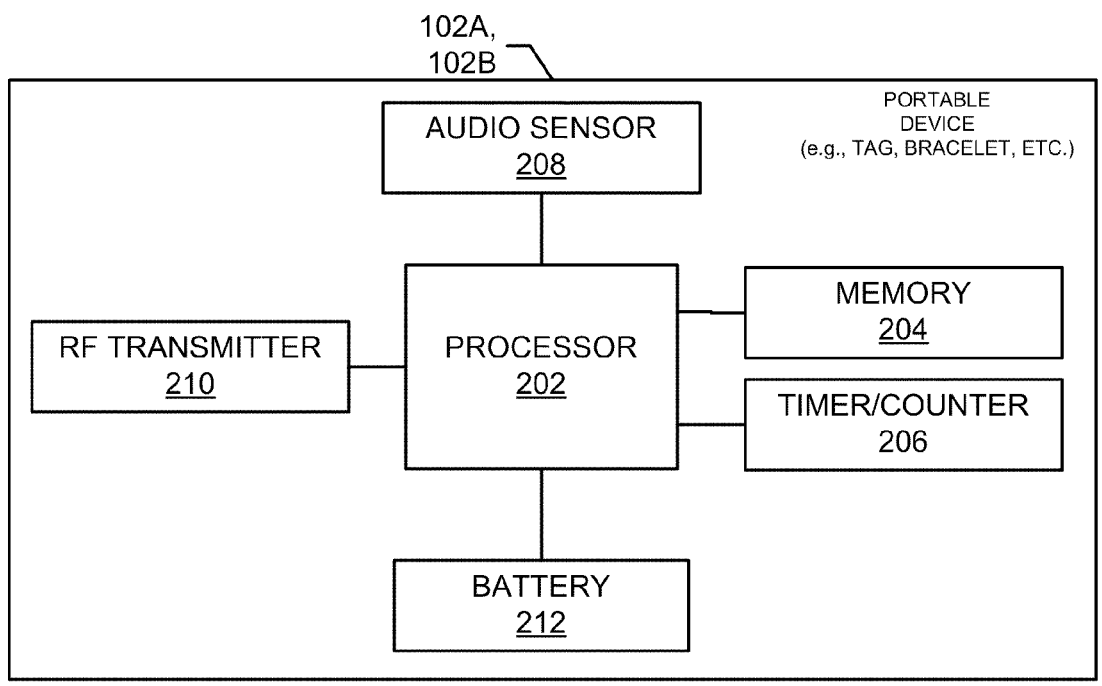
FIG. 2 is a schematic illustration of an example tag device for use in the system of FIG. 1.

Turning to FIG. 2, an example tag 102A, 102B may be worn or carried by an audience member (e.g., the audience member 104A) to enable determination of the distance the audience member is from the example media delivery center 106. The example tag 102 of FIG. 2 captures audio information that is exposed to the carrier (e.g., audience member 104A), reduces, decimates and/or otherwise processes the captured audio information to reduce memory storage and/or processing requirements, and transmits a reduced set of audio information back to the base unit 110 as one or more packaged RF signals. At least one benefit realized in response to decimating the audio information received by the example tag 102A, 102B is that battery life is improved as a result of reducing an amount of data transmitted to the base unit 110, thereby permitting the example tag 102A, 102B to operate in an environment for a greater amount of time before requiring recharging and/or battery replacement.

As described in further detail below, the example tag 102A, 102B initiates a request to determine a distance between the tag 102A, 102B and the base unit 110 near an audio source, such as the example speaker 108. The tag 102A, 102B emits an RF initialization pulse, which propagates at the speed of light toward the base unit 110, to initiate audio sampling of the example area 101. Both the tag 102A, 102B and the base unit 110 may begin audio sampling at substantially the same time, and the tag 102A, 102B triggers the end of audio sampling by sending a subsequent RF signal to the base unit 110 containing a representation of collected audio data by the tag 102A, 102B. In some examples, the tag 102A, 102B is expected to operate in the example area 101 (e.g., a room, a portion of a street, an amusement park waiting line, etc.), thereby maintaining an opportunity for constant communication and/or accessibility to the example base unit 110. In other examples, the tag 102A, 102B may be removed from the example area 101 for periods of time. For instance, in the event that the example tag 102A, 102B is provided to an amusement park attendee, the amusement park may include any number of example areas 101 in which a distance calculation may be initiated. However, during instances where the amusement park attendee is walking to/from areas of the amusement park, the example tag 102A, 102B may not be able to communicate with a base unit, such as the example base unit 110 of FIGS. 1 and 3. To prevent the example tag 102A, 102B from wasting battery resources by transmitting one or more sets of collected audio data via an RF transmission, the example tag 102A, 102B may utilize the example RF transmitter in a bi-directional manner. For instance, after transmitting the initialization RF signal to any available base unit 110, the example tag 102A, 102B may wait for acknowledgement from the base unit 110 via a base unit RF acknowledgement signal. If the tag 102A, 102B fails to receive such an RF acknowledgement signal within a threshold amount of time, the tag 102A, 102B refrains from further audio collection activities for a period of time. However, if the tag 102A, 102B receives an RF acknowledgement signal within the threshold amount of time, then the tag 102A, 102B proceeds to capture ambient audio signal data, decimate the captured audio data to reduce an RF transmission bandwidth, and transmit such decimated captured audio data to the base unit 110.

The example base unit 110 processes the received audio data to determine a match between the tag 102A, 102B audio data and the collected base unit 110 audio data. The base unit may calculate a number of samples that elapse between the RF initialization pulse and the matching-point of the audio data to determine how much time elapsed between the sound received by the base unit 110 versus the tag 102A, 102B. Additionally, because the propagation speed of sound is known, a distance value may be calculated by the base unit 110 to represent the distance between the tag 102A, 102B and the base unit 110.

In the illustrated example of FIG. 2, the tag 102 includes a processor 202, a memory 204, a timer/counter 206, an audio sensor 208, a radio frequency (RF) transmitter 210, and a battery 212. In operation, the example processor 202 invokes the RF transmitter 210 to emit an initialization RF signal to be received by the example base unit 110 of FIG. 1. The initialization RF signal facilitates data acquisition synchronization between the base unit 110 and the tag because, for all practical purposes, both the base unit 110 and the tag 102 receive the RF signal at the same time. On the other hand, any sound emitted from the example speaker 108 propagates at a substantially slower rate than the RF signal, which can provide an indication of distance based on any measured time lag of the audio propagation. In response to receipt of the initialization RF pulse/signal the example base unit 110 and the tag 102 to begin accumulating audio within the example area 101. After initialization, audio samples are detected and/or otherwise collected by the example tag audio sensor 208. The audio sensor 208 may be a microphone in communication with the processor 202 to collect audio samples at a sample rate. After some time period during which audio samples are collected, a subset of the collected audio samples is transmitted back to the example base unit 110. This subset of samples is used to determine a distance between the tag 102 and the base unit 110. The base unit 110 also collects audio samples, which are typically received from the audio source 108 before they are received by the tag 102 due to closer proximity of the base unit 110 to the audio source 108. However, some of the audio samples collected by the tag 102 will not be collected by the base unit 110 due to the propagation delay of sound from the source 108 to the tag 102, as described in further detail below.

After collecting data for a period of time, as set by the example timer/counter 206 (e.g., five seconds worth of data), the tag 102 transmits a subset of the data to the base unit 110 for analysis. The subset of the audio samples that is transmitted back to the example base unit 110 is less than the total amount of data that is presented to the tag 102, thereby substantially conserving battery power. As described in further detail below, the base unit 110 receives the initialization RF signal to begin collecting data and stops collecting data when the example tag 102 begins to transmit its subset of collected audio data. The base unit 110 employs information from the initialization RF signal and the received subset of audio samples from the tag 102 to calculate one or more distance values.

Generally speaking, presently existing microphones and corresponding data collection hardware and/or software (e.g., executing on the example processor 202) capture audio at, for example, 8000 samples per second (sample rate). Additionally, if the speed of sound is approximately 13,041.6 inches every second, an 8 kHz sample rate may correspond to a distance of 1.6 inches per sample. While a sample rate of 8 kHz allows a sample to be collected once every 125 microseconds (125 µS), such a high sample rate results in a relatively large amount of data to be transmitted by the tag 102 via the example RF transmitter 210. Moreover, such a high sample rate may not be needed when matching one or more sets of collected audio samples from the tag 102 with one or more sets of collected audio samples from the example base unit 110. Thus, the example tag 102 may send a subset of audio data to the base unit 110 that is indicative of an audio envelope rather than a detailed audio signature. Furthermore, for instances in which the example tag 102 is to provide a general indication of relative distance between itself and the example base unit 110, a high sample rate may not be necessary. As described in further detail below, the methods, systems, apparatus and articles of manufacture described herein employ the audio data envelope collected by the example tag 102 and an audio data signature collected by the example base unit 110 to ascertain a relative distance between the example tag 102 and the base unit 110. As used herein, an audio data envelope represents audio data having a smaller amount of information than the data from which it is derived (e.g., an audio signature). Reduction of the information of an audio signature is described in further detail below and may include, but is not limited to decimating an audio signature and/or applying one or more scale factors to an audio signature.

Figure 3:
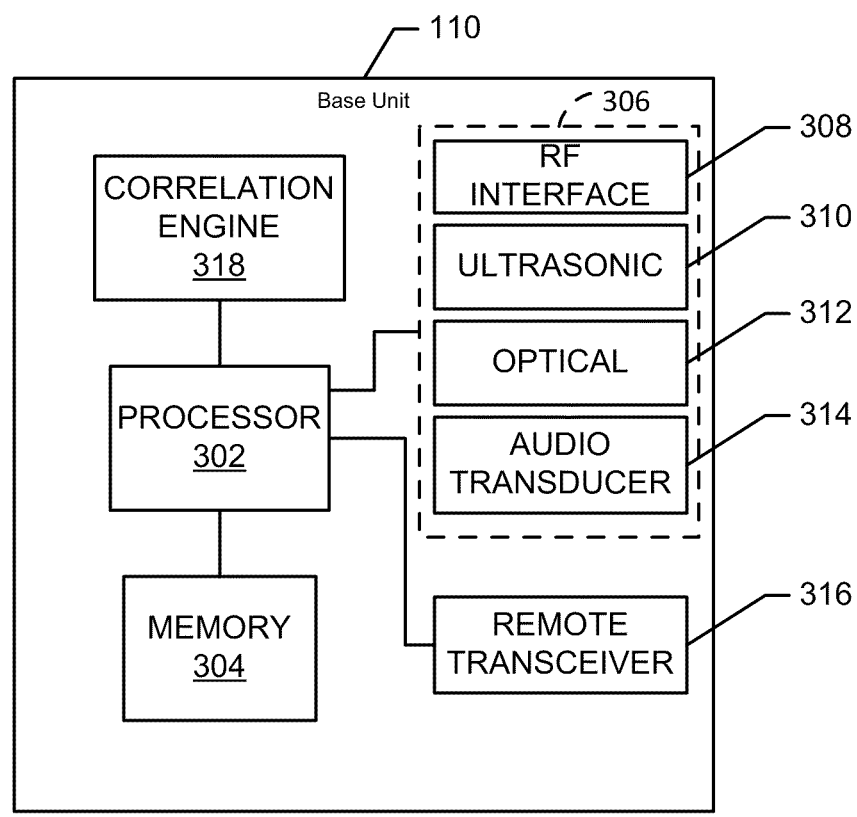
FIG. 3 is a schematic illustration of an example base unit for use in the system of FIG. 1.

FIG. 3 is a block diagram of the example base unit 110 of FIG. 1. As shown in FIG. 3, the example base unit 110 includes a processor 302, a memory 304, and a plurality of sensors and/or transducers 306. In the illustrated example, such sensors and/or transducers 306 include an RF interface 308, an ultrasonic transceiver 310, an optical sensor and/or transmitter (e.g., transceiver) 312, and an audio transducer 314. The following example focuses on a base unit 110 that includes any of the RF interface 308 and the audio transducer 314, but, as noted, other example base unit(s) 110 may include additional or alternate structure(s). The example base unit 110 also includes a remote transceiver 316 that receives the monitoring data collected and/or processed by the base unit 110 and/or received by the tag 102 and sends it to, for example, the central facility 112 (FIG. 1). The example base unit 114 of FIG. 1 also includes a correlation engine 318, which is communicatively coupled to the processor 302 as shown to facilitate one or more correlation calculations between tag 102 audio signals and base unit 110 audio signals, as described below in connection with FIG. 11. The example correlation engine 318 may employ any type of statistical and/or correlation algorithm on received data such as, but not limited to a normalized correlation, Pearson correlation coefficients and/or rank correlation coefficients.

The processor 302 is used to control and/or perform various operations or features of the base unit 110 and may be implemented using any suitable processor, including any general purpose processor, application specific integrated circuit (ASIC), logic circuit, digital signal processor (DSP), or any combination thereof. For example, the processor 302 may be configured to receive location information, motion information, audio information and/or media monitoring information. Information collected may be stored in the memory 304 and communicated to the central facility 118 either in its collected form or a format for further processing.

The processor 302 of the illustrated example is configured to control communication processes that occur between the base unit 110 and other processing systems (e.g., the central facility 118). The processor 302 may cause the remote transceiver 316 to communicate monitored, collected, calculated and/or raw audio data to, for example, the central facility 118 (FIG. 1). Additionally, the processor 302 and/or the memory of the base unit 110 may be programmed to carry out the processes of FIGS. 5 and/or 7A below.

The memory 304 is substantially similar or identical to the memory 204 (FIG. 2) and may be used to store program instructions (e.g., software, firmware, etc.), data (e.g., location information, motion information, media monitoring information, audio samples, etc.), and/or any other data or information.

The RF interface 308 may be implemented using a transmitter, a receiver, or a transceiver. The RF interface 308 may be configured to transmit and/or receive location-related information and/or to communicate with the RF transmitter 210 (FIG. 2) of the tag 102. However, to reduce power consumption by the example tag 102, the example RF interface 308 is configured to receive information from, not send information to, the example RF transmitter 210, thereby eliminating any need for the tag 102 to consume battery 212 power listening for communication(s) from the example RF interface 308. Where multiple tags 102 are present, each tag 102 is assigned a unique code (e.g., a digital signature of bits, an RF signature, etc.) to enable the base unit 110 to identify the data it receives as associated with a corresponding tag and to distinguish tags when calculating relative distances therebetween.

The RF interface 308 is configured to receive RF information from the tag 102 indicative of one or more sets of collected and decimated audio samples. For example, the RF interface 308 may receive a set of audio samples that have been packaged into an RF-transmittable format by the example tag 102. As described above, where multiple tags 102 are present, each tag 102 is assigned a unique code to enable the base unit 110 to distinguish which tag(s) have initiated a data collection request (e.g., an RF initialization signal) and/or the tag(s) associated with received sets of audio samples. The RF interface 308 may be implemented using any suitable RF communication device such as, for example, a cellular communication transceiver, a Bluetooth® transceiver, an 802.11 transceiver, an ultrawideband RF transceiver, etc.

The remote transceiver 316 of the illustrated example is used to communicate information between the base unit 110 and, for example, the central facility 112 (FIG. 1). The remote transceiver 316 is communicatively coupled to the network 114 and may be implemented using any suitable wired or wireless communication transceiver including, for example, a telephone modem, a DSL modem, a cable modem, a cellular communication circuit, an Ethernet communication circuit, an 802.11 communication circuit, a powerline modem, etc. The remote transceiver 316 may be used to communicate media monitoring information (e.g., audio samples, codes, and/or signatures), location information, and/or motion information to the central facility 112 via the network 114.

Figure 4:
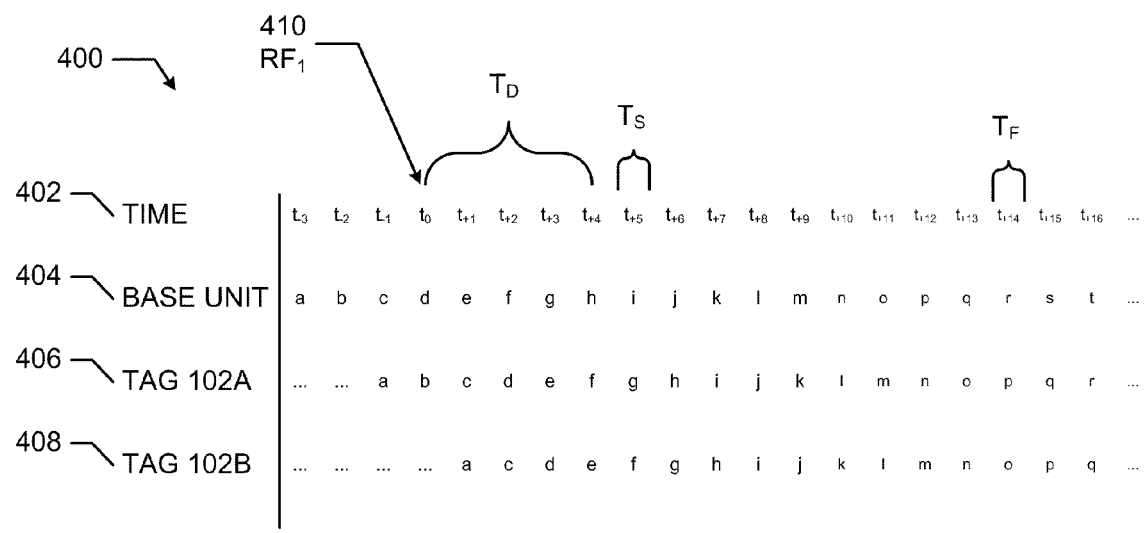
FIG. 4 is an example timing diagram associated with audio sample timing between the example tag device and base unit of FIGS. 1-3.

FIG. 4 illustrates an example wireless tag timing diagram 400 indicative of audio samples received by the example base unit 110 and two example wireless tags, such as the example tags 102A and 102B of FIG. 2. In the illustrated timing diagram 400 of FIG. 4, a timing row 402 identifies data sample timing units ranging from $t_3$ to $t_{+16}$ timing units. Each timing unit in the example timing row 402 is indicative of an amount of time that corresponds to a data rate of the tag 102. As described above, currently existing microphones and/or corresponding driver hardware/software typically sample audio data at a rate of 8 kHz (although such rates may be superseded with newer technologies developed during the lifetime of this patent). However, in the illustrated example of FIG. 4, each timing unit (e.g., $t_1$, $t_0$, $t_{+1}$, ..., etc.) represents a sample rate decimated by a factor of five (5). The decimation factor described herein is selected as an example value of five for purposes of discussion and not limitation, thus, any other value may be selected. In the illustrated example of FIG. 4, each timing unit represents a span of 625 µS. As described in further detail below, while the example tag (e.g., 102A) returns one or more subsets of audio data (via the example RF transmitter 210) at a decimated rate, thereby reducing the volume of data to be transmitted by the example RF transmitter 210, the example base unit 110 may capture audio data at the same rate or capture at a higher data rate (e.g., 8 kHz) because it is unconcerned and/or less concerned with power savings than the battery powered tags.

In the illustrated example timing diagram 400 of FIG. 4, a base unit row 404 indicates which audio samples occurred at the base unit 110 at the corresponding timing row 402 timing unit, a tag 102A row 406 indicates which audio samples occurred at a first tag 102A (e.g., a bracelet worn by an audience member) at a corresponding time as indicated by the timing row 402, and a tag 102B row 408 indicates which audio samples occurred at a second tag 102B at a corresponding time as indicated by the timing row 402. The illustrated example timing diagram 400 reflects an RF initialization signal 410 to identify when a tag (e.g., tag 102A) emitted an indication that the tag 102A is beginning to collect audio samples, thereby triggering capturing of audio samples at the base unit. In the illustrated example of FIG. 4, the tag 102A is responsible for the RF initialization signal 410, which is indicated by $RF_1$ at time $t_0$ from the example timing row 402. Receipt of $RF_1$ by the base unit 110 causes the base unit 110 to begin saving audio samples to the memory 304. $RF_1$ also corresponds to the time at which the first tag 102A begins saving received audio samples.

To illustrate a relative time in which audio samples arrive at the example base unit 110, the first tag 102A and the second tag 102B, the example timing diagram 400 represents a series of audio samples using lower case letters "a" through "t." While the alphabetic representations "a" through "t" could be replaced by an analog audio signal representation(s), such as shown and described below in connection with FIG. 7B, the alphabetic representation is employed herein for ease of explanation. In the illustrated example, the base unit 110 is closer to the source of the audio samples than the tags 102A, 102B, and receives audio sample "a" at time $t_{-3}$ (see base unit row 404), while tag 102A does not receive audio sample "a" until time $t_{-1}$, and tag 102B does not receive audio sample "a" until time $t_{+1}$, which suggests that tag 102B is further away from the base unit 110 than tag 102A. In operation, the tag 102A transmits the $RF_1$ initialization signal 410 to indicate the beginning of a distance calculation. The tag 102A emits the $RF_1$ signal at substantially the same time it begins sampling ambient audio via its audio sensor 208 at time $t_0$. Additionally, the receipt of the $RF_1$ initialization signal 410 by the RF interface 308 of the example base unit 110 is, for all practical purposes, instantaneous due to its speed-of-light propagation. As a result, the tag 102A and the base unit 110 begin collecting data at substantially the same time.

Assuming that the tag 102A (corresponding to row 406) begins saving audio samples to memory immediately after the $RF_1$ initialization signal 410, any attempt to compare, for example, audio sample "c" with the same audio sample collected by the base unit 110 (corresponding to base unit row 404) will never result in a match. This is true because at the moment the $RF_1$ initialization signal 410 was transmitted by the tag 102, the sound energy corresponding to audio sample "c" had already propagated away from the base unit 110 (on its way to the tag 102). Accordingly, any attempt to compare collected audio samples "c" at tag 102A with base unit audio samples will result in failure and/or wasted processing resources. Furthermore, energy consumed by the tag 102A in sampling, storing and/or transmitting audio sample "c" to the base unit 110 is wasted and represents battery energy that could have otherwise been consumed sending data that has a chance of being matched to audio samples collected by the base unit 110.

To prevent transmitting wasted audio samples, the example tag 102A employs the timer/counter 206 to wait for a delay time $T_D$ before saving audio sample data to memory 204. The example delay time $T_D$ may be set to any value, such as a value that corresponds to the maximum size of a room or other monitored area of interest. For example, in the event that an analyzed room, such as the example area 101 of FIG. 1, is 12-feet long, then the delay time $T_D$ may be set for 11 milliseconds (mS), assuming that the speed of sound is 13,041.6 inches/second (not including atmospheric calibration). In that case, the chances of both the base unit 110 and any tag 102 in the example area 101 storing the same audio signals are relatively high versus when the delay time $T_D$ is set to any lower value. Upon the expiration of the delay time $T_D$, the example tag 102 begins saving audio signals as data samples to the memory 204 at a start time $T_S$ and stops saving data samples to the memory at a finish time $T_F$. The example tag 102 may also save a timestamp associated with each data sample to allow a delay calculation between the tag 102 and the base unit 110, as described in further detail below. Additionally or alternatively, the tag 102 may save an indication of how many data samples are saved to the memory 204. For example, the tag 102 may store an integer value starting at one to correspond to the first data sample, a value of two to correspond to the second data sample, and so on. In operation, if the example tag 102 stores fifteen data samples, where each data sample is separated by, for example, 625 μS, then the duration of tag 102 data sample collection after the expiration of $T_D$ is 9.375 mS (approximately 10.2 feet). In other examples, each data sample may be separated by 125 uS based on the type of microphone hardware employed by the example tag 102. Regardless of the initial audio rate, collected audio samples may be processed to yield any other value of samples per unit of time, such as data generated at 100 samples per second to correspond to each data sample separation of 0.01 seconds. Unlike storing a timestamp associated with each data sample, storing an integer value consumes fewer memory and/or processing tag 102 resources. In the illustrated example of FIG. 4, the start time $T_S$ occurs at time $t_{+5}$ and the finish time $T_F$ occurs at time $t_{+14}$. In other words, the example tag 102 saves ten (10) data samples to the memory 204 as a set, and sends the set of data samples (i.e., audio samples "g" through "p") to the example base unit 110 to, in part, signal to the base unit 110 that audio sample data acquisition should stop.

At this point, the base 110 unit has received the initialization signal $RF_1$, collected its own set of audio samples "d" through "r," (which are stored in a memory as data samples) has received the set of data samples from the tag 102A (i.e., audio samples "g" through "p"), but otherwise has no knowledge of how far the tag 102A is from the base unit 110. To calculate how far the tag 102A is from the base unit 110, the base unit 110 searches the received set of data samples from the tag 102A (i.e., audio samples "g" through "p") for a match corresponding to its own data samples. In the event that the example base unit 110 identifies that a match exists at its own data sample "g," which was received by the base unit at time $t_{+3}$, the base unit 110 now has sufficient information to calculate a difference between time $t_{+3}$ and the time at which the initialization signal $RF_1$ was sent. In other words, the base unit 110 subtracts a base unit 110 timestamp at $t_{+3}$ from a tag 102 timestamp at $t_{+5}$ to yield a difference of two time units. In other examples, the base unit 110 may subtract an integer value of one associated with the first tag 102 data sample from an integer value of three associated with the third base unit 110 data sample to identify a difference of two time units between the tag 102 and the base unit 110. The number of time units may then be multiplied by the time per each unit, which may further be multiplied by the speed of sound to determine a relative distance between the base unit 110 and the tag 102. For example, in the event that each time unit t corresponds to 0.625 mS, then 1.25 mS multiplied by 13,041.6 inches per second yields a relative distance of 16.3 inches. After determining a distance between the tag 102A and the base unit 110, the stored set of audio samples from the tag 102A (i.e., "g" through "p") may be analyzed to identify the media content. Similarly, the stored audio samples from the base unit 110 (i.e., "d" through "r") may be analyzed to identify the media content.

While the example tag distance calculation system 100 has been illustrated in FIGS. 1, 2 and 3, one or more of the interfaces, data structures, elements, processes, user interfaces, and/or devices illustrated in FIGS. 1-3 may be combined, divided, re-arranged, omitted, eliminated and/or implemented in any other way. Further, the example tags 102A, 102B, the example media delivery center 106, the example base unit 110, the example central facility 112, the example server 116, the example database 118, the example processor 202, the example memory 204, the example timer/counter 206, the example audio sensor 208, the example RF transmitter 210, the example processor 302, the example memory 304, the example sensors/transducers 306, the example RF interface 308, the example ultrasonic transceiver 310, the example optical sensor/transmitter 312, the example correlation engine 318 and/or the example audio transducer 314 of FIGS. 1-3 may be implemented by hardware, software, firmware and/or any combination of hardware, software and/or firmware. Thus, for example, any of the example tags 102A, 102B, the example media delivery center 106, the example base unit 110, the example central facility 112, the example server 116, the example database 118, the example processor 202, the example memory 204, the example timer/counter 206, the example audio sensor 208, the example RF transmitter 210, the example processor 302, the example memory 304, the example sensors/transducers 306, the example RF interface 308, the example ultrasonic transceiver 310, the example optical sensor/transmitter 312, the example correlation engine 318 and/or the example audio transducer 314 may be implemented by one or more circuit(s), programmable processor(s), application specific integrated circuit(s) (ASIC(s)), programmable logic device(s) (PLD(s)) and/or field programmable logic device(s) (FPLD(s)), etc.

FIGS. 5, 6, 7A, 9 and 11 illustrate example processes that may be performed to implement the example tag distance calculation system 100 of FIGS. 1-3. The example processes of FIGS. 5-7A, 9 and 11 may be carried out by a processor, a controller and/or any other suitable processing device. For example, the example processes of FIGS. 5-7A, 9 and 11 may be embodied in coded instructions stored on any tangible computer-readable medium such as a flash memory, a CD, a DVD, a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other tangible medium. Alternatively, some or all of the example processes of FIGS. 5-7A, 9 and 11 may be implemented using any combination(s) of ASIC(s), PLD(s), FPLD(s), discrete logic, hardware, firmware, etc. Also, one or more of the example processes of FIGS. 5-7A, 9 and 11 may instead be implemented manually or as any combination of any of the foregoing techniques, for example, any combination of firmware, software, discrete logic and/or hardware. Further, many other methods of implementing the example operations of FIGS. 5-7A, 9 and 11 may be employed. For example, the order of execution of the blocks may be changed, and/or one or more of the blocks described may be changed, eliminated, subdivided, or combined. Additionally, any or all of the example processes of FIGS. 5-7A, 9 and 11 may be carried out sequentially and/or carried out in parallel by, for example, separate processing threads, processors, devices, discrete logic, circuits, etc.

Figure 5:
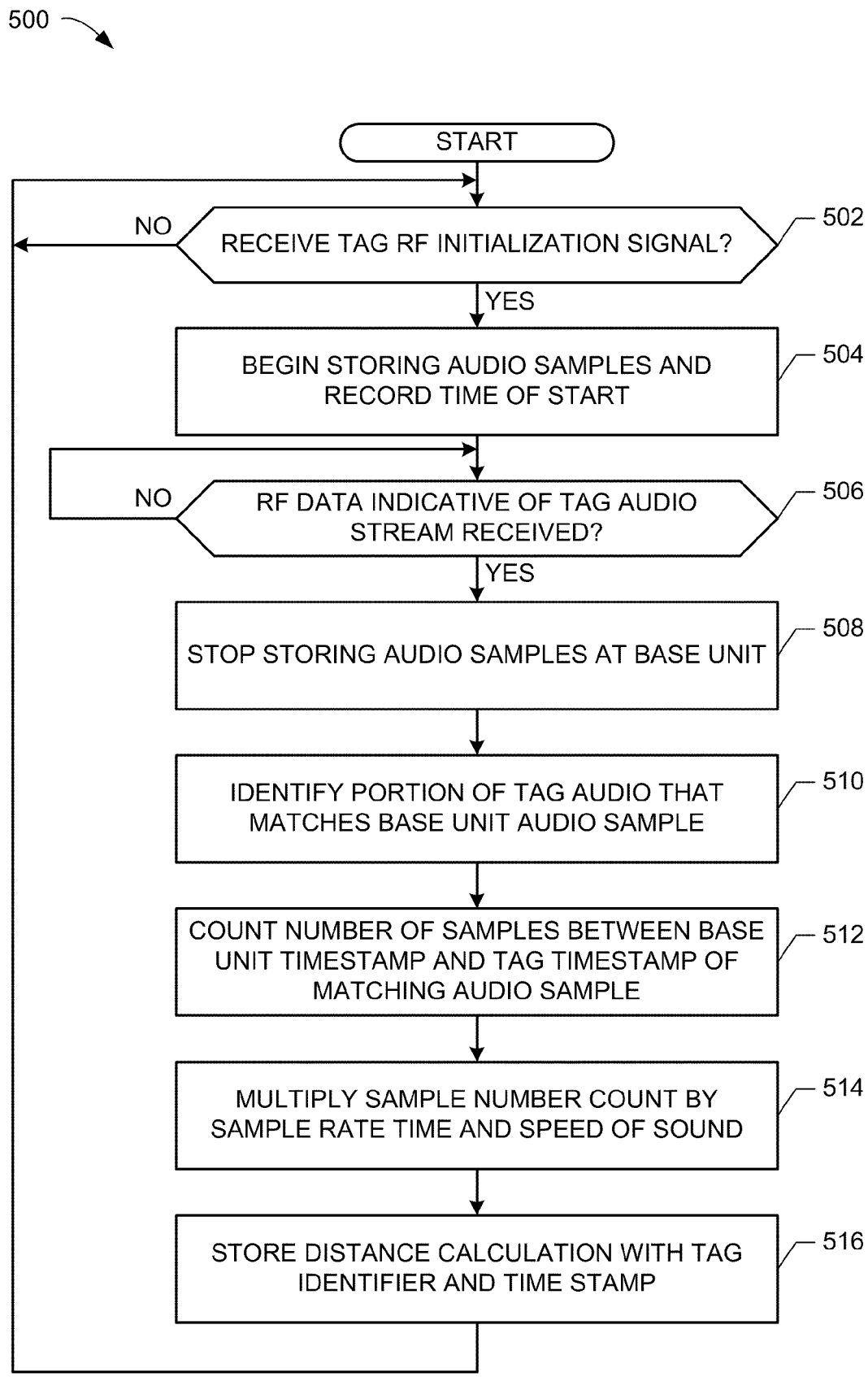
FIGS. 5, 6, 7A, 9 and 11 are flowcharts representative of example processes that may be performed by the example system shown in FIG. 1.

The example process 500 of FIG. 5 begins with the processor 302 of the example base unit 110 monitoring for an RF initialization signal from one or more tags 102A via the example RF interface 308 (block 502). If no RF initialization signal is received, the example process 500 of FIG. 5 waits. Otherwise, after the RF interface 308 receives the RF initialization signal, the example processor 302 invokes the audio transducer 314 to begin storing received audio samples to the memory 304 (block 504). The example RF initialization signal may include identification information regarding which tag 102A is initiating a distance measurement. Each tag 102A, 102B may include a tag identifier that is embedded with the example RF initialization signal, such as $RF_1$ as described above in connection with FIG. 4.

The example base unit 110 continues to store the audio information it detects via the example audio transducer 314 to the memory 304 (block 506), and stops recording audio upon receipt of an RF transmission indicative of a tag 102A, 102B audio stream (block 508). In other words, instances of distance measurement between a tag 102A, 102B and the base unit 110 are invoked by each tag 102A, 102B that may be present in the example area 101. By allowing each tag 102A, 102B to operate without continuous signal monitoring, additional power consumption of the tag(s) 102A, 102B is minimized. The example base unit 110 parses the received audio stream data that was embedded in the RF signal transmitted by the tag 102A, 102B to identify a portion of audio that matches audio samples collected by the base unit (block 510). During base unit audio sample storage, the example base unit 110 stored a representation of the audio signal (e.g., one or more acoustic energy values, one or more acoustic frequency values, a series of values from a microphone, etc.) and a time (time stamp) at which the audio signal was saved to the base unit memory 304. The example processor 302 counts a number of samples between a timestamp on the base unit associated with the matching audio signal representation, and a timestamp on the tag 102A associated with the matching audio signal representation.

Each sample saved by the base unit 110 is collected at a known frequency and is matched with a corresponding time stamp or integer value indicative of the incremental data sample stored to memory. For example, if the base unit 110 sample rate is set equal to that of the tag 102A (e.g., 1600 Hz), then each data sample is separated from an adjacent data sample by a time of 625 µS. As such, the number of samples is multiplied by the time per sample by the example processor 302, which is further multiplied by the speed of sound to calculate a distance value (block 514). The distance value calculation is stored in the memory 304 along with a time stamp (block 516) and the example base unit 110 returns to block 502 to await another RF initialization signal.

Figure 6:
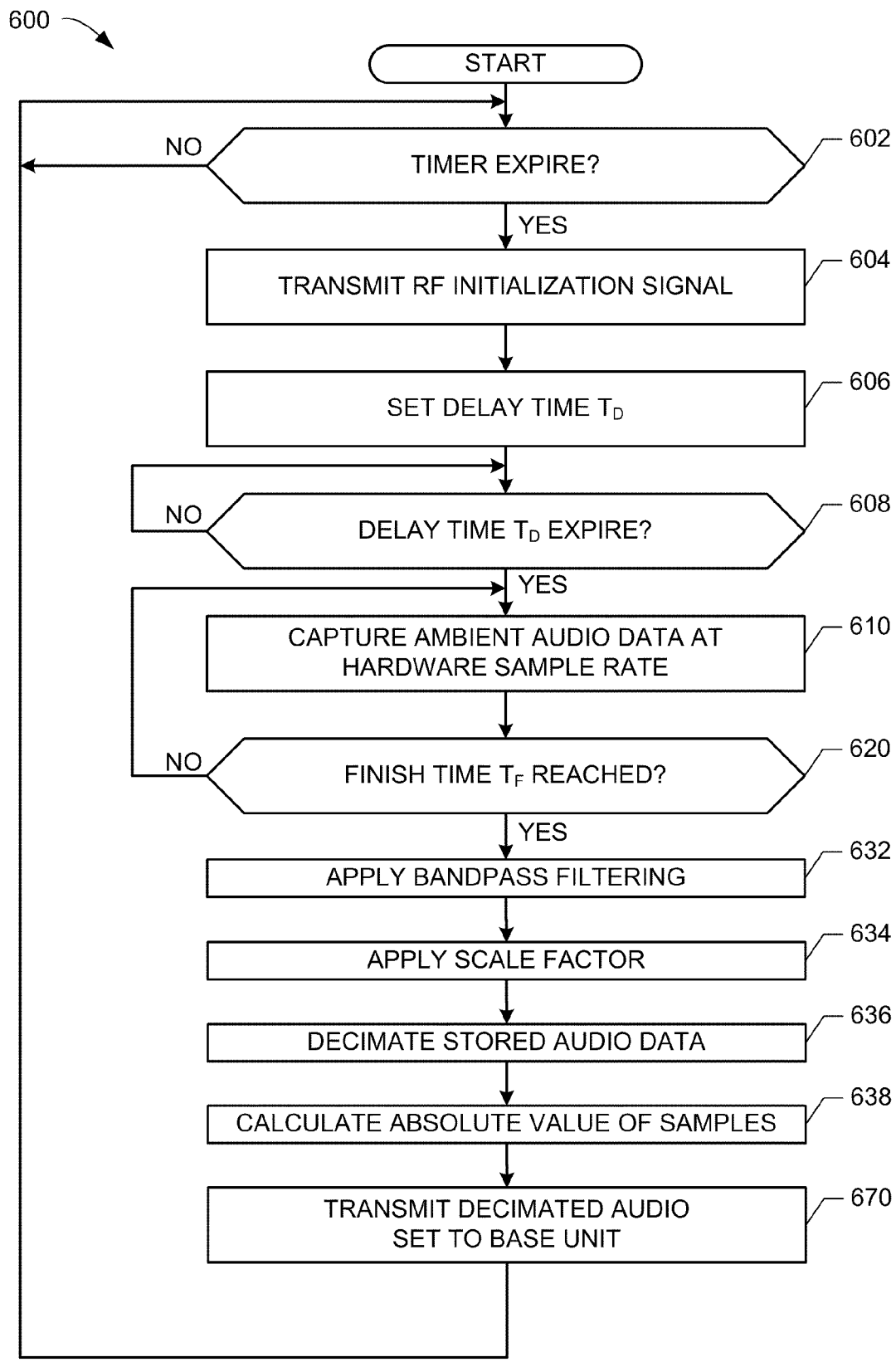

The example process 600 of FIG. 6 illustrates operation of the example tag 102A or 102B during a distance calculation. In the illustrated example of FIG. 6, the example processor 202 invokes the example timer/counter 206 to expire after a predetermined time period, such as a duration of every 10 minutes for which a distance calculation is desired (block 602). While the time period has not expired (block 602), the example process 600 waits in a loop. However, when the example timer/counter 206 signals to the processor 202 that the time period has expired (block 602), the example processor 202 of the tag 102 invokes the example RF transmitter 210 to transmit an initialization signal to the base unit 110 (block 604).

As described above, the example tag 102A or 102B does not immediately start sampling and/or storing ambient audio data to memory immediately after transmission of the RF initialization signal because, in part, some of the initial audio data would have already propagated past the base unit 110 (and not been stored) on its way to the tag 102A or 102B. As a result, the earliest audio data collected by the tag 102A or 102B would never match audio signal(s) collected by the base unit 110. Additionally, transmitting one or more audio samples from the tag 102A or 102B to the base unit 110 that have no possibility of resulting in a match needlessly consumes tag 102A or 102B battery resources. To minimize and/or eliminate wasted processing and/or transmission resources of the tag 102A or 102B, the example processor 202 invokes the timer/counter 206 to initiate a delay time $T_D$ (block 606). In effect, the delay time $T_D$ allows the example tag 102A or 102B to "catch-up" with the audio samples captured by the example base unit 110. If the timer/counter 206 does not indicate that the delay time $T_D$ has expired (block 608), then control loops to block 608 until the expiration of the delay time $T_D$.

When the delay time $T_D$ expires (block 608), the processor 202 causes the example audio sensor 208 to begin capturing ambient audio data at the rate designated by the tag 102A or 102B hardware configuration (block 610). As described above, industry standard audio capture devices and/or corresponding audio data acquisition software may capture at a default data rate, such as 8 kHz. In some instances, modification of audio data acquisition hardware and/or corresponding software may be cumbersome and/or difficult to access. In other instances, off-the-shelf audio data acquisition solutions may be desired to maintain simplicity and minimize cost of the example tag 102A or 102B. While processing and/or storage of audio data samples at a higher data rate may create a greater demand for battery power resources, such demands are of less importance than the substantially greater drain of battery power resources typically associated with packaging and transmission of RF data from the example tag 102A or 102B. As such, efforts to decimate collected audio data are applied to the stored audio samples before they are prepared for RF transmission, as described in further detail below.

If the finish time $T_F$ has not yet been reached (block 620), then the example process 600 of FIG. 6 returns to block 610 and the process continues to collect ambient audio data. On the other hand, when the finish time $T_F$ has been reached (block 620), which indicates that the time period for audio data acquisition has ended, the example processor 202 applies a bandpass filter (block 632). The bandpass filter may be facilitated by way of software executing on the example processor 202 or by way of one or more solid state filters (not shown). Bandpass filters may operate between, for example, 300 Hz to 3 kHz, and/or any other value(s) of interest. A scale factor (e.g., adjustable, fixed, variable, proportional to a percentage of source data, etc.) may be applied to the decimated audio data set (block 634) to further reduce an amount of data transmitted from the tag 102A, 102B to the base unit 110. For example, while many microprocessors and/or microcontrollers available accommodate register sizes of any number of bits (e.g., 8-bit, 12-bit, etc.), such full resolution of bits is not always needed for sufficiently accurate distance calculations and/or estimations. Accordingly, one or more scale factors may be applied to the data to reduce a number of bits needed per audio sample (block 634).

In the illustrated example of FIG. 6, the processor 202 decimates the ambient audio data stored in the memory 204 (block 636). Data decimation may occur by, for example, accessing and removing every $N^{th}$ audio sample stored in the example memory 204, where N may be an integer value. For example systems 100 that employ audio sampling hardware at 8 kHz, which yields a resolution of distance calculations within 1.6 inches between samples, the example tag 102A or 102B may employ a decimation factor (N) of, for example, twenty (20) for circumstances where greater resolution is not necessary. Any other decimation factor (N) may be employed, without limitation, such as a decimation factor of eighty (80). An example decimation factor of twenty (20) substantially decreases the amount of audio sample data transmitted from the tag 102A, 102B to the base unit 110. While any value of N may be employed as the decimation factor to reduce the transmitted data volume from the tag 102A, 102B, higher decimation factors may affect the resolution of one or more calculated distance values of the tag 102A, 102B location. In other words, application of a decimation factor (N) includes a tradeoff between battery conservation with resolution.

Additionally, the example processor 202 calculates or determines an absolute value of the samples saved to the example memory 204 (block 638), which may simplify binary representation(s) of the collected audio samples. In other words, using the absolute value of the samples (block 638) eliminates a need to process negative signage of one or more binary values.

The decimated set of audio data is then transmitted to the base unit (block 670), and control returns to block 602. Generally speaking, the example base unit 110 receives tag 102A, 102B data, receives audio data acquired from the audio transducer 314, and then processes the received data to determine a distance value between the tag 102A, 102B and the base unit 110. In operation, after the example base unit 110 receives the tag 102A, 102B data, the received tag 102A, 102B data is expanded in a manner consistent with a decimation factor applied by the tag 102A, 102B. In the event that the example tag 102A, 102B applied a decimation factor of 20, then the base unit 110 reverses the decimation by expanding by the inverse of the factor. A moving average may be applied by the example base unit 110, such as an N-point moving average. In some examples, a moving average N of 20 produces satisfactory results, but any other value may be employed as desired. The example expansion and moving average produces curve data suitable for comparison purposes. As such, if the example tag 102A, 102B originally sampled audio at 8000 samples per second prior to decimating by a factor of 20 (e.g., thereby transmitting 400 samples), then the aforementioned expansion and moving average produces an 8000 sample per second data set suitable for one or more comparison(s).

As described above, the example base unit 110 also acquires audio data samples from the audio transducer 314. In operation, the example base unit 110 subtracts each acquired audio sample from a moving average of N past and current audio samples. In some examples, a moving average value N of 8 produces satisfactory results, but any other value may be employed as desired. After determining an absolute value, the example base unit 110 applies a moving average of N points, such as 20. While an example moving average value N of 20 produces satisfactory results in certain environments, any other moving average value N may be employed as desired.

Prior to transmitting one or more decimated audio data sets to the example base unit 110, the example tag(s) 102A, 102B may also employ one or more compression techniques to the decimated and/or scaled data prior to RF transmission in an effort to further reduce an amount of transmitted data. Compression techniques may include, but are not limited to commercial compression techniques (e.g., gzip, which is free software released under the GNU General Public License) and binary run-length encoding.

In some examples, additional battery conservation may occur by eliminating the bandpass filter hardware and/or eliminating one or more bandpass filter calculations performed by the example processor 202 of the tag 102A, 102B. Although the effect of bandpass filtering may facilitate proper data processing by the tag 102A, 102B (e.g., removal of DC components, etc.), the computationally-intensive process of bandpass filtering may be replaced with a moving average process. In one example, a moving average is subtracted from the current audio sample. The moving average may be calculated using Y audio samples, which includes the current audio sample and Y−1 prior audio samples. For some example circumstances, a moving average value Y of 4 yields satisfactory results, but any other value(s) may be employed, as desired. During operation, the example moving average using the prior Y audio samples may replace block 632 of the process 600 of FIG. 6.

In the event that more than one tag 102A, 102B operates in the example area 101 at the same time, the example base unit 110 may process each distance measurement request separately. For example, upon receipt of an RF initialization signal from the tag 102A, the base unit 110 may allocate processing resources, such as the processor 302, and memory 304 to store and/or process audio signals captured by the audio transducer 314. Further, if tag 102B also transmits an RF initialization signal, the base unit 110 may allocate the processing resources with a separate section of the memory 304 in which to store audio signals captured by the audio transducer 314. In other examples, any audio data collected by the base unit 110 and stored to the memory 304 may be shared for overlapping time period(s), thereby conserving memory resources and may further reduce processing demands imposed upon the example processor 302. Each set of data captured and/or otherwise processed by the base unit 110 may be further associated with an indication of the tag 102A, 102B responsible for a distance calculation request.

Figure 7A:
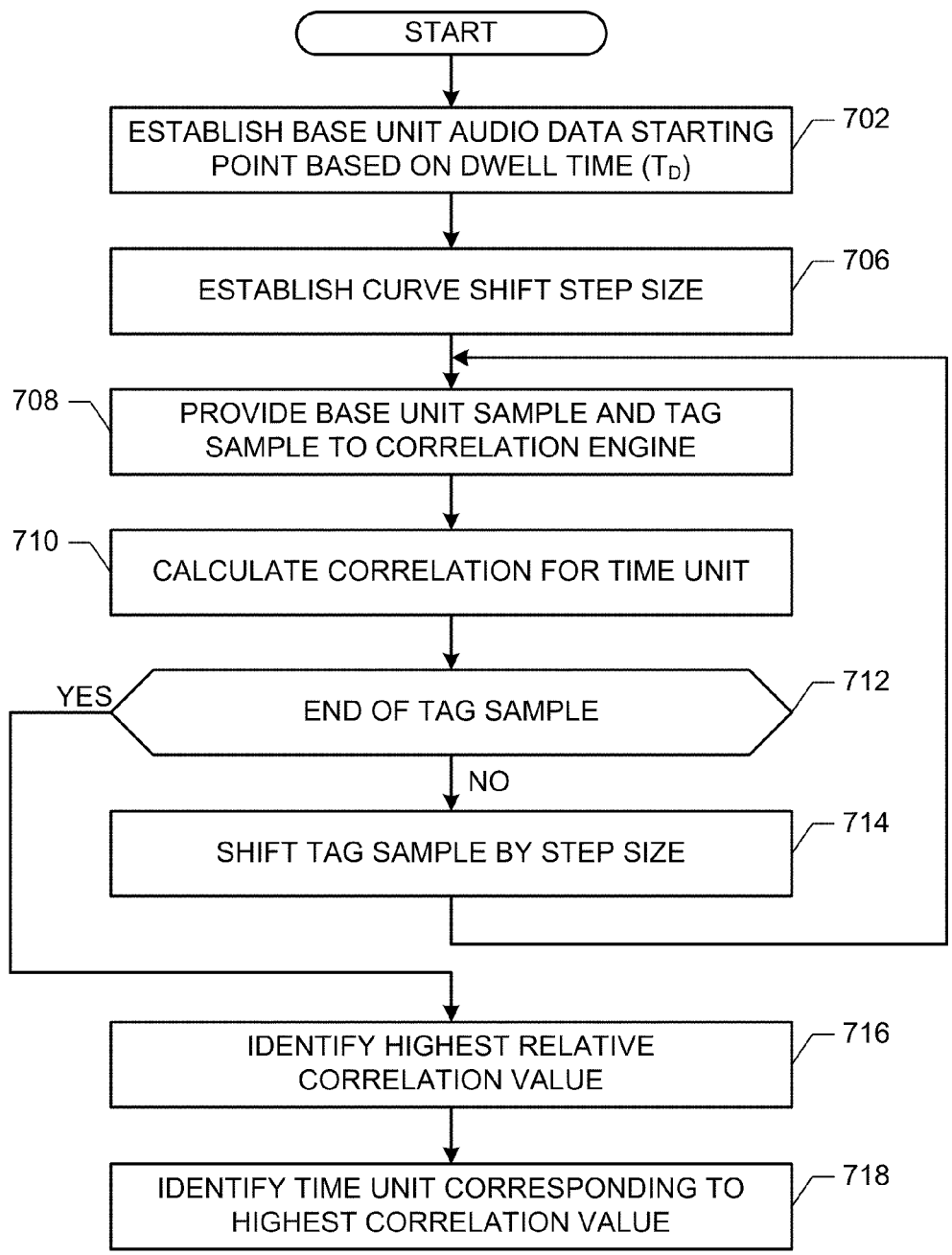

The example process 700 of FIG. 7A illustrates correlation based matching between audio signals collected at the tag 102A, 102B and audio signals collected at the base unit 110. The example process 700 of FIG. 7A may be executed to, in part, satisfy some or all of the procedures described in block 510 of the example process 500 of FIG. 5. As described above, the audio samples stored in the memory 304 of the base unit 110 begin at the moment in time at which the RF initialization signal (see 410 of FIG. 4) was transmitted by the example tag 102A or 102B. However, because a portion of the earliest audio samples captured by the example tag 102A or 102B lacks parity with the audio samples captured by the example base unit 110, the example correlation engine 318 establishes a base unit audio sample starting point based on the delay or dwell time $T_D$ used by the example tag 102A or 102B (block 702). The dwell time $T_D$ allows any subsequent analysis, comparison and/or calculation of correlation values between the collected tag 102 audio signals and the collected base unit 110 audio signals to overlap with each other.

Figure 7B:
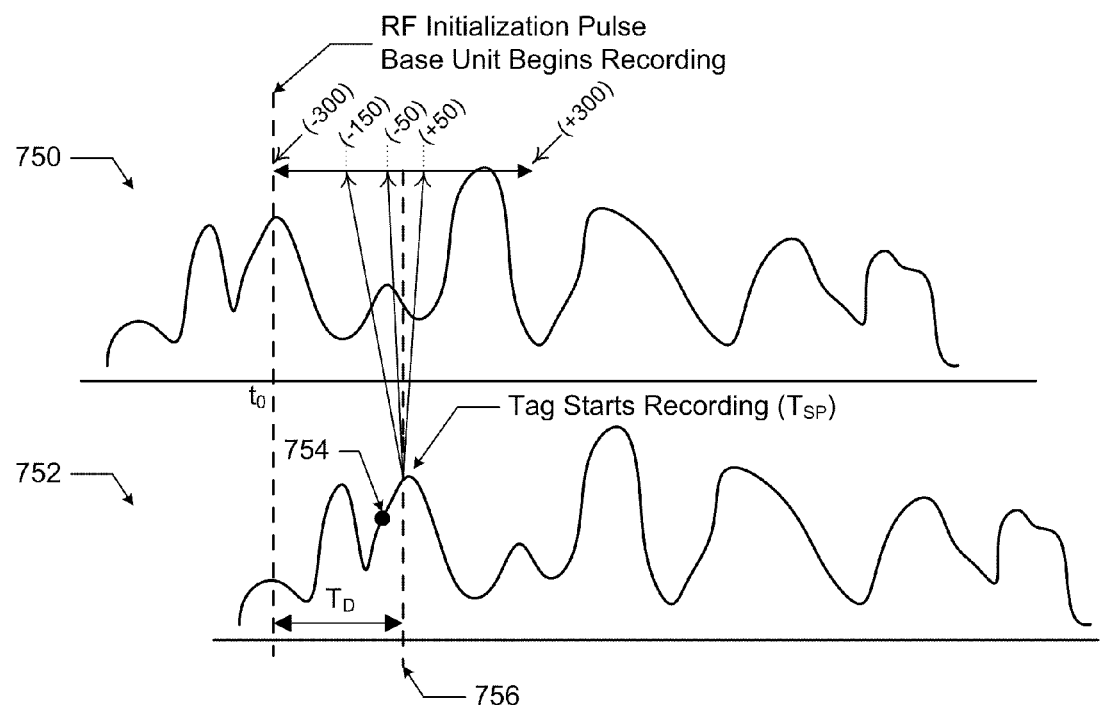
FIG. 7B illustrates example audio waveforms exposed to the example base unit and tag of FIGS. 1-3.

Turning briefly to FIG. 7B, a base unit audio waveform 750 is captured by the base unit 110 at a time earlier than a tag audio waveform 752 due to the fact that the base unit 110 is closer to the audio source 108 than the tag 102A. At time $t_0$, an RF initialization pulse transmitted by the example tag 102A causes the base unit 110 to begin capturing audio signals. Additionally, at time $t_0$, the tag 102A is exposed to a portion of audio signal data that has already passed the base unit 110 and may not be in the memory of the base unit 110 As described above, the example time delay ($T_D$) is selected to correspond to a maximum desirable distance from the base unit 110. In the event that the tag 102A, 102B is at a distance less than the distance corresponding to the maximum $T_D$ value, a portion of the tag 102A, 102B data prior to $T_D$ will be present in the base unit 110 memory 304. In other examples in which the tag 102A, 102B is near or immediately adjacent to the base unit 110, all of the data stored by the tag 102A, 102B will also likely be stored in the base unit 110 memory 304. In any event, to ensure certainty in comparisons and/or calculations with base unit 110 data and tag 102A, 102B data, comparisons only occur with such data that was collected after the expiration of $T_D$. As such, the example tag 102 refrains from saving audio signals until after the delay time $T_D$ has expired to ensure that attempts to compare the example base unit audio waveform 750 and the example tag audio waveform 752 for a matching point(s) are successful.

While an overlap between tag audio signals 752 from the tag 102A and audio signals 750 from the base unit 110 may allow for an identification of a match during one or more comparisons therebetween, which may illustrate a propagation time delay from the audio source to the tag 102A, there may be some circumstances in which it is desired to identify a strong lack of correlation. For instance, a strong lack of correlation is expected when audio signals captured by the tag 102A have not also been captured by the base unit 110, such as at an example offset point 754 of FIG. 7B. In the event that an attempt is made to calculate a correlation between the offset point 754 from the tag audio waveform 752 and $t_0$ of the base unit audio waveform 750 (e.g., via a regular normalized correlation formula, a covariance function, etc.), then a low, zero or negative correlation value is expected. However, upon shifting an analysis position within the tag audio waveform 752 over to the expiration of the time delay $T_D$ (756), an attempt to calculate a correlation between a tag data starting point $T_{SP}$ and $t_0$ of the base unit audio waveform 750 will result in a positive correlation value due to the similarity and/or exactness of the two waveforms (i.e., a match). In other words, circumstances in which some correlation value transitions to a much higher correlation value may be indicative of a point at which the base unit waveform 750 and the tag waveform 752 match. In other examples, a threshold correlation value difference between adjacent calculated correlation values is indicative of a match.

In some examples, a value of $T_D$ (756) may be set to 300 sample units, which corresponds to approximately 41 feet when each sample unit occurs at a frequency of 8 kHz. However, in other examples a wide range of $T_D$ value(s) may be employed to ensure a peak in the correlation value(s) is detected. Once a $T_D$ value is chosen, such as an example value of 300, a compatible search range may be employed during the comparison (e.g., −300 to 0). In the event of uncertainty and/or concern for variability of system 100 performance, then the search range may be extended to include a number of both positive and negative time values (e.g., a range between −300 and 20, a range between −300 and 50, etc.). For circumstances in which the tag 102A, 102B and the base unit 110 data are swapped, a range between −300 and +300 may be employed for convenience. Range searches may be performed on tag 102A, 102B data and/or base unit 110 data, without limitation. However, in the event that one or more range searches are performed by the base unit 110, the example tag 102A, 102B does not need to consume additional battery power resources.

Figure 7C:
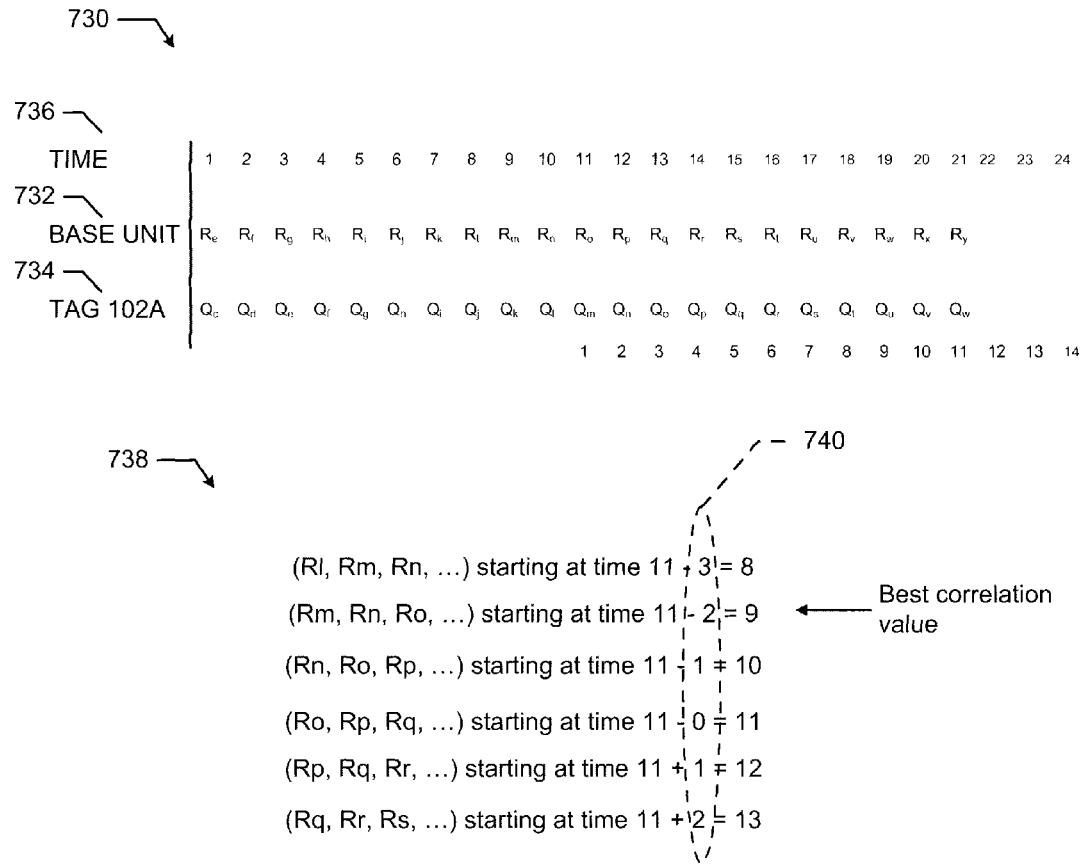
FIG. 7C illustrates a schematic of example base unit and tag data points.

In the illustrated example of FIG. 7C, a schematic illustration 730 of base unit 110 data points 732 and tag 102A, 102B data points 734 are shown relative to a timeline 736. Example base unit 110 reference points 732 begin with sample $R_e$ while example tag 102A, 102B query points 734 begin with sample $Q_e$, each at a time of 1. The example base unit 110 reference points 732 represent a series of 4,000 data points spaced ten (10) audio samples apart, which corresponds to a total width of 40,000 data points when five (5) seconds of data are collected at 8,000 samples per second. Similarly, the example tag 102A, 102B reference points 734 represent a series of 4,000 data points spaced ten (10) audio samples apart from each other, which corresponds to a total width of 40,000 data points when five (5) seconds of data are collected at 8,000 samples per second. As described above, while the example correlation engine 318 is capable of processing audio data points at relatively high rates (e.g., 8 kHz), such large amounts of data may not be necessary to achieve a satisfactory resolution for establishing a calculation of distance between the example base unit 110 and the tag 102A, 102B. In some examples, taking a portion of the collected data points for a period of time allows a basic shape of the audio waveform (e.g., 752) to be realized when greater precision is not needed. Although the tag 102A, 102B reference points 734 will have matching reference points to the base unit 110, one or more differences caused by, for example, noise and/or distortion may be present.

In the illustrated example of FIG. 7C, $T_D$ is set to a value of 10, and a sequence of tag 102A, 102B data is taken starting at tag sample $Q_m$. Any number of subsequent tag 102A, 102B data may be used as a subset of tag samples for comparison purposes (e.g., tag samples $Q_m$, $Q_n$, $Q_o$, $Q_p$, etc.). In the event that a search range from −3 to +3 is conducted (740), which may analogous to the example range of −300 to +300 described in connection with FIG. 7B, then the subset of tag 102A, 102B data may be compared to reference points centered around the time of 11 (i.e., the initialization time+ $T_D$=1+10) (e.g., base unit samples $R_l$, $R_m$, $R_n$, etc.). In other words, the subset of tag samples $Q_m$, $Q_n$, $Q_o$, $Q_p$, etc. are each iterated during one or more comparisons with offsets of the reference samples, as shown by an iteration sequence 738. Each iteration produces a correlation value for a series of the selected tag samples (e.g., starting at $Q_m$) and a plurality of reference samples (e.g., a series starting at $R_l$, a series starting at $R_m$, a series starting at $R_n$, etc.). One or more additional iterations may proceed with an alternate tag sample series (e.g., a series starting at $Q_n$) to cycle through a subset of base unit samples. Any search range value and/or step size may be employed by the methods, systems, apparatus and articles of manufacture described herein. For instance, in the event that an increase in comparison speed is desired, steps may be set to five (5) samples (i.e., approximately 8 inches) in view of a lower resolution tradeoff.

As shown in the illustrated example of FIG. 7C, the base unit 110 reference samples $R_m$, $R_n$, $R_o$ correspond to a local maximum correlation value, thereby indicating a likely match between audio signals collected at the base unit 110 and the tag 102A, 102B. The highest correlation value occurs at a relative offset of −2 samples, which further corresponds to a distance of 3.262 inches (assuming each sample equals 1.631 inches based on a speed of sound of 13,041.6 inches per second).

For example, the collected base unit samples starting at $R_m$ (reference sample) produces a relative maximum (e.g., a local maximum) when the mathematical correlation is applied to the series of tag samples starting at $Q_m$. For instance, one or more mathematical correlations between the tag sequence starting with sample $Q_m$ and the remaining reference sequences (e.g., $(R_k, R_l, \ldots)$, $(R_n, R_o, \ldots)$, etc.) result in a correlation value (sometimes referred to as a correlation score) that is lower than that of the reference series (sequence) starting with $R_m$ and the tag sequence starting with $Q_m$. After identifying the series that results in the relative maximum correlation score, the correlation engine 318 identifies an indication of time associated with when the samples were collected by the example base unit 110 and tag 102A. In some examples, the indication of time is received and/or otherwise retrieved from the base unit 110 as time stamp information generated by the processor 202 and processor 302 of the tag 102A and the base unit 110, respectively. However, tasks associated with generating one or more timestamps cause the tag 102A and base unit 110 to incur additional power drain and/or device cost.

While the example base unit 110 may not be affected by the additional power drain associated with the timestamp hardware and/or processing, because it is likely connected to an A.C. power outlet, the example tag 102A is powered by the battery 212, which has limited power resources. Rather than rely on timestamp hardware and/or timestamp tasks to be executed by the example processors 202, 302, the indication of time may be derived from counting a number of collected samples from a known threshold indicator. An example known threshold indicator for the base unit 110 is the receipt of the RF initialization signal (e.g., see 410 of FIG. 4), and an example known threshold indicator for the tag 102A is $T_D$. Unlike timestamp hardware and/or timestamp tasks to be executed by the example processors 202, 302, a number of collected samples from the threshold indicator is a simple integer value. In operation, the example correlation engine 318 identifies the highest correlation value associated with one tag series and one base unit series, such as the example tag 102A series starting at $Q_m$ and the example base unit 110 series starting at $R_m$ of FIG. 7C. When each of $Q_m$ and $R_m$ were saved to the memory 204 and 304, respectively, an integer-based indication of time was also saved (e.g., the first sample saved is integer 1, the second sample saved is integer 2, etc.). Continuing with the illustrated example of FIG. 7C, the base unit indicator of time for $R_m$ is nine (9) from the RF initialization signal threshold indicator, and the tag 102A indicator of time for $Q_m$ is one (1) from the $T_D$ threshold indicator. The difference between $Q_m$ and $R_m$ is calculated by [tag integer+$T_D$]−[base unit integer] (i.e., [1+10]−9=2) and, because the time between each saved sample is known, the distance between the base unit 110 and the tag 102A may be calculated based on the speed of sound.

Returning to FIG. 7A, the example correlation engine 318 selects $T_D$ range value to increase the likelihood of waveform overlap during one or more comparisons between the base waveform 750 and the tag waveform 752. A curve shift step size is established and/or otherwise selected (block 706), which dictates the span of sample sizes analyzed during one or more comparison(s). For example, if each sample was captured at 8 kHz, then a step size of 5 samples corresponds to a physical distance of approximately 8 inches (i.e., the distance that sound can travel in five sample periods).

For each step, a set of base unit samples and tag samples are provided to the example correlation engine 318 (block 708) and the example correlation engine 318 calculates a corresponding correlation value associated with the time unit (block 710). Data used by the example correlation engine 318 may occur by way of, for example, 4000 data samples having a separation of 10 time units therebetween. In other words, while an original example audio sample of five (5) seconds at 8000 samples per second produces 40,000 data samples, the example separation of 10 time units substantially reduces the data load. In other examples, data used by the example correlation engine 318 may occur by way of 200 data samples having a separation of 80 time units therebetween. In this example, while an original example audio sample of two (2) seconds at 8000 samples per second produces 16,000 data samples, the example separation of 80 time units substantially reduces the data load. Such a reduced data load reduces computational burdens on the example base unit 110. For example, if the first set of base unit samples and tag samples are provided to the correlation engine 318 at sample number 80 (e.g., based on the selected starting point (block 702)), then data sample number 80 has a corresponding distance based on the distance sound travels for 80 sample periods. Assuming, for purposes of explanation and not limitation, each unit of time corresponds to an 8 kHz data capture rate, then sound travels approximately 1.63 inches per sample period. Accordingly, 80 sample periods corresponds to a distance of 10.9 feet. The example processor 302 counts a number of samples that occurred between the point at which both waveforms (i.e., the tag 102A, 102B waveform 752 and the base unit 110 waveform 750) match with the highest correlation value. Each such counted sample corresponds to 1.63 inches of separation between the tag 102A, 102B and the base unit 110. If all the tag waveform 752 samples have not been compared and/or correlated to one or more portions of the base unit waveform 750 (block 712), the tag data sample is shifted by the step size (block 714) and control returns to block 708. Otherwise, after all tag data samples have been calculated to find a corresponding correlation value (block 712), the example correlation engine 318 identifies a highest relative correlation value (block 716).

Briefly turning to FIG. 7D, an example list of correlation values 770 calculated by the correlation engine 318 are shown. The example list of correlation values 770 includes a time unit column 772 and a corresponding correlation value column 774. As described above, a higher correlation value is indicative of a greater likelihood that the data from the base waveform 750 and the tag waveform 752 match, while lower correlation values represent a lower likelihood that the waveforms match. As the example correlation engine 318 calculated and shifted through the data, as described above in connection with FIG. 7A, rows of correlation values with corresponding time units were saved to the memory 304 of the example base unit 110. Time unit 93 (a relative time) is identified by the example correlation engine 318 to have the highest relative correlation value within the list of correlation values 770 (block 718). Accordingly, the time unit 93 associated with the highest correlation value is deemed to represent the distance that the tag 102 was from the base unit 110. In other words, the tag 102 was 12.6 feet away from the base unit 110 (i.e., 93 relative time units multiplied by 1.631 inches per time unit yields approximately 12.6 feet).

For circumstances in which the example area 101 includes a room having substantial echo, a highest correlation value may not necessarily represent a match between the base waveform 750 and the tag waveform 752. In the illustrated example of FIG. 8, an example list of correlation values 800 has a time unit column 802 and a correlation value column 804 and spans from time unit 80 through time unit 180. As described above, time unit 93 illustrates a local maximum correlation value of 0.352820, which is indicative of a match between audio data from the base unit waveform 750 and the tag waveform 752. However, in the event that the example tag 102 collects audio signal data for a duration of, for example, five (5) seconds, then one or more echoes may occur in the example area 101. In particular, time unit 168 of the example list of correlation values 800 illustrates a local maximum correlation value of 0.368839. In the event that the example area 101 is a room of twelve by twelve feet, then the local maximum at time unit 168 is an unrealistic indication of a match because it corresponds to approximately 22.4 feet. Accordingly, the local maximum correlation value at time unit 168 is likely the result of an echo.

To combat and/or eliminate false positives as described above, the methods, systems, apparatus and articles of manufacture described herein may employ a threshold value limit of acceptable time units in which to identify a local maximum correlation value. Threshold values for time units may be established based on advanced knowledge of one or more example area(s) 101 in which the tag 102 may operate. For circumstances where the tag(s) 102 will be used in relatively small rooms, such as 10'×10' rooms, threshold values for the time unit may be set at or around 74 time units. On the other hand, for circumstances where the tag(s) 102 will be used in larger rooms, such as 15'×15' rooms, threshold values for the time unit may be set at or around 110 time units.

In other examples, the example methods, systems, apparatus and articles of manufacture described herein identify and/or eliminating false positives caused by echo phenomenon by disqualifying correlation peaks at a later time regardless of the duration of such peaks and/or the magnitude of the correlation value at such peaks. For example, echo suppression may occur by way of evaluating correlation value results in a sequential manner from a closest distance to a farthest distance of interest. In the event of a first local maximum correlation peak at a first time (i.e., the first time corresponds to a highest correlation value when compared to all prior times), the first time is deemed to be the desired maximum if it remains higher than N time samples following thereafter (e.g., for 30, 50 and/or 100 time samples, where each time sample is 1/8000 seconds). As such, even if a higher correlation value is detected at a later time (e.g., farther away), such later higher correlation values are deemed to be associated with one or more echo phenomena and ignored. In other words, all other peaks that may occur at a later time are, in effect, locked out from consideration. For instance, if another distance estimate exhibits a second local maximum correlation value having a higher magnitude, the second local maximum correlation value is not deemed to be a valid match of waveforms (750, 752) because it was locked out based on the first local maximum. A sufficient number of time samples N may be determined and/or otherwise established in any manner, including empirical tuning For example, values of N may include, but are not limited to 30, 50 and 100, which correspond to distance values of 4 feet, 7 feet and 14 feet, respectively when considering a speed of sound at 13,041.6 inches per second (741 miles per hour).

The example system 100 may also accommodate different types of microphones employed by the tags 102A, 102B and/or base unit 110. Example microphones may exhibit and/or be constructed with a particular polar pattern, thereby affecting directional sensitivity to sound. For example, unidirectional polar pattern microphones excel at capturing sounds from a relatively narrow degree range, while omnidirectional polar pattern microphones respond to a relatively wider degree of incident sound energy. Based on the type of microphone(s) employed by the example tags 102A, 102B and/or the example base unit 110, decimation rate(s), scaling threshold(s) and/or correlation value threshold(s) may be adjusted accordingly.

The example tag distance calculation system 100 may also be used to identify participant presence within a room for circumstances in which distance calculations are not needed. As described above, higher correlation values represent greater similarity between captured tag 102 audio and base unit 110 audio signals. Threshold correlation values may be empirically determined for one or more example area(s) 101 to indicate whether a tag (and its wearer) are present within the example area(s) 101 by virtue of the magnitude of the correlation value.

The example tag distance calculation system 100 may also be used to distinguish audience member exposure from audience member consumption. Generally speaking, audience member exposure to media content indicates that the audience member was proximate to the media content, but not necessarily engaged in listening and/or watching the media content. Audience member consumption, on the other hand, reflects media content with which the audience member is engaged and/or to which the audience member is paying attention.

Figure 9:
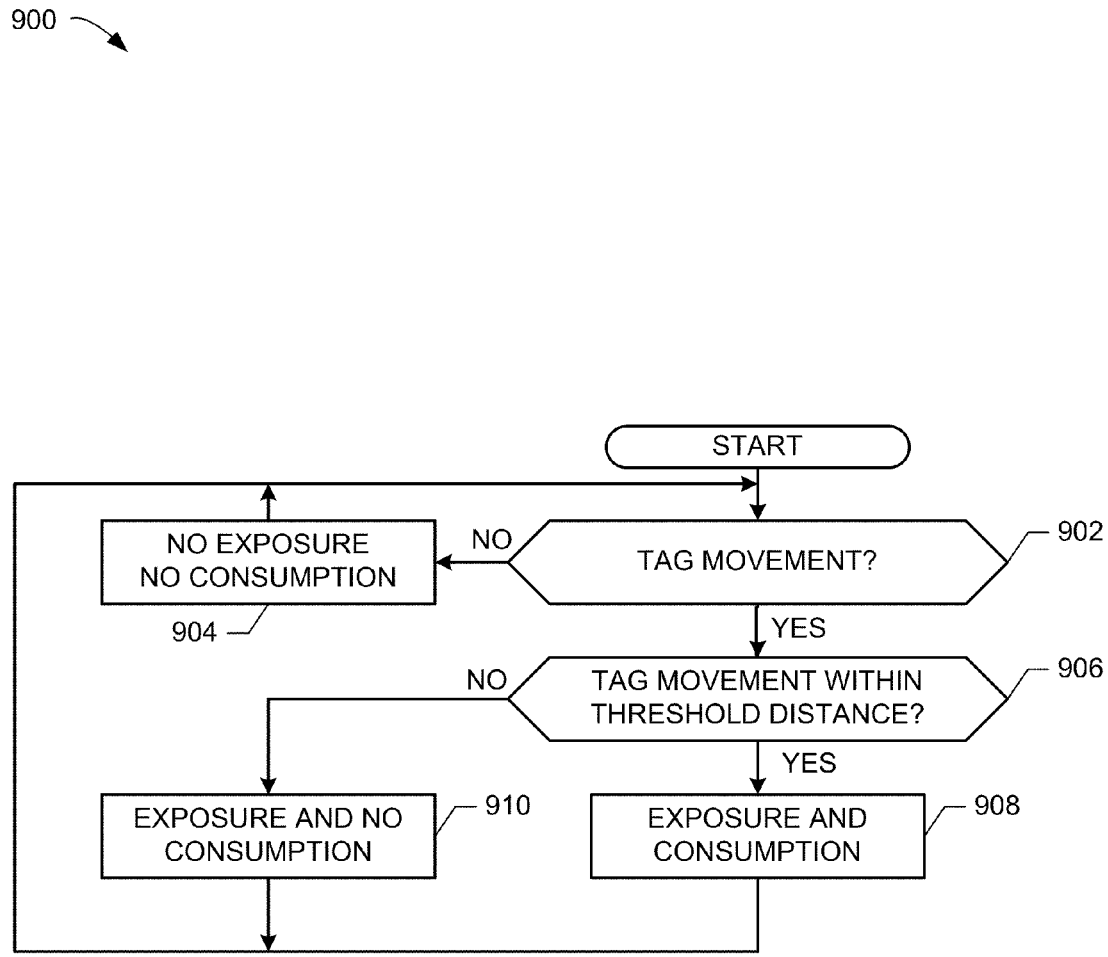

The example process 900 of FIG. 9 begins with the base unit 110 analyzing collected and processed tag 102A, 102B data and base unit audio data for an indication of whether the tag 102A, 102B has moved (block 902). If not, then the base unit 110 and/or system 100 may determine that there has been no exposure and/or consumption of media content that is emitted by the example media delivery center 106 via the example speaker 108 (block 904). On the other hand, in the event that the base unit 110 analyzes the collected and processed tag 102A, 102B data and base unit data to determine tag movement has occurred (block 902), then the base unit 110 may further compare the magnitude of the tag 102A, 102B movement with one or more threshold values (block 906). For example, movement within three (3) to seven (7) feet may be indicative of an audience member that is exploring a museum from room to room and dwelling for a period of time to engage with an informational kiosk and/or a presenter. In such example scenarios, the example base unit 110 may determine that exposure and consumption of media content has occurred (block 908). On the other hand, in the event that an audience member exhibits substantial movement within an example area 101, such as a waiting queue for an amusement park ride, then the example base unit 110 may determine that exposure (e.g., to an overhead television) has occurred, but consumption of such media has not occurred (block 910).

In some examples, further analysis of the correlation values provides insight as to whether the tag 102A, 102B is inside or outside the example area 101. As described in further detail below, the correlation values calculated in connection with FIGS. 7D and/or 8 may be further calculated in connection with information indicative of a base unit 110 volume (reference volume) and a tag 102A, 102B volume. Generally speaking, the example correlation engine 318 generates an inside/outside correlation score in a manner consistent with Equation 1.

$$C_{score} = f(\beta_n, C_S, R_V, T_V)$$ Equation 1.

In the above example Equation 1, $C_{score}$ represents the inside/outside correlation score(s), $B_n$ represents constant(s) of a selected polynomial, as determined by least-squares fitting, $C_s$ represents correlation values calculated in connection with FIGS. 7D and/or 8, $R_v$ represents a normalized reference volume (e.g., base unit 110 volume), and $T_v$ represents a normalized tag volume (e.g., tag 102A, 102B volume). In some examples, $B_n$ may represent a vector of constants controlling one or more aspects of the function, such as a set of constants that define an Nth order polynomial. In operation, the example correlation engine 318 trains the example base unit 110 and tag 102A, 102B under known conditions of inside the example area 101 and outside the example area 101. Such training occurs for a given hardware configuration for the base unit 110 and tag 102A, 102B and a corresponding polynomial employed with the least-squares fitting technique(s).

In one example, training may include a linear polynomial having input variables $C_s$, $R_v$ and $T_v$ having the form illustrated by example Equation 2.

$$C_{score} = B_1 + B_2 C_s + B_3 R_v + B_4 T_v \quad \text{Equation 2.}$$

In the illustrated example of Equation 2, $C_{score}$ better indicates whether the tag 102A, 102B is inside or outside in a manner improved over the original correlation score $C_s$. The training procedure may include placing the example base unit 110 and tag 102A, 102B outside the example area 101 and inside the example area 101 while recording corresponding values of $C_s$, $R_v$ and $T_v$. Application of a least-squares procedure(s) facilitates determination of a mathematically optimal value for constants $B_1$, $B_2$, $B_3$ and $B_4$. After the training procedure, values for the constants may be fixed and the polynomial may be applied to new values for $C_s$, $R_v$ and $T_v$ in new scenarios.

Without limitation, one or more alternate polynomials may be employed that use $C_s$, $R_v$ and $T_v$, as shown in the example of Equation 3.

$$\begin{aligned} C_{score} = &B_1 + B_2 C_s + B_3 R_v + B_4 T_v + \\ &B_5 C_s C_s + B_6 R_v R_v + B_7 T_v T_v + B_8 C_s R_v + B_9 C_s T_v + \\ &B_{10} R_v T_v + B_{11} C_s C_s C_s + B_{12} R_v R_v R_v + B_{13} T_v T_v T_v + \\ &B_{14} C_s C_s C_s C_s + B_{15} R_v R_v R_v R_v + B_{16} T_v T_v T_v T_v. \end{aligned} \quad \text{Equation 3}$$

Figure 10:
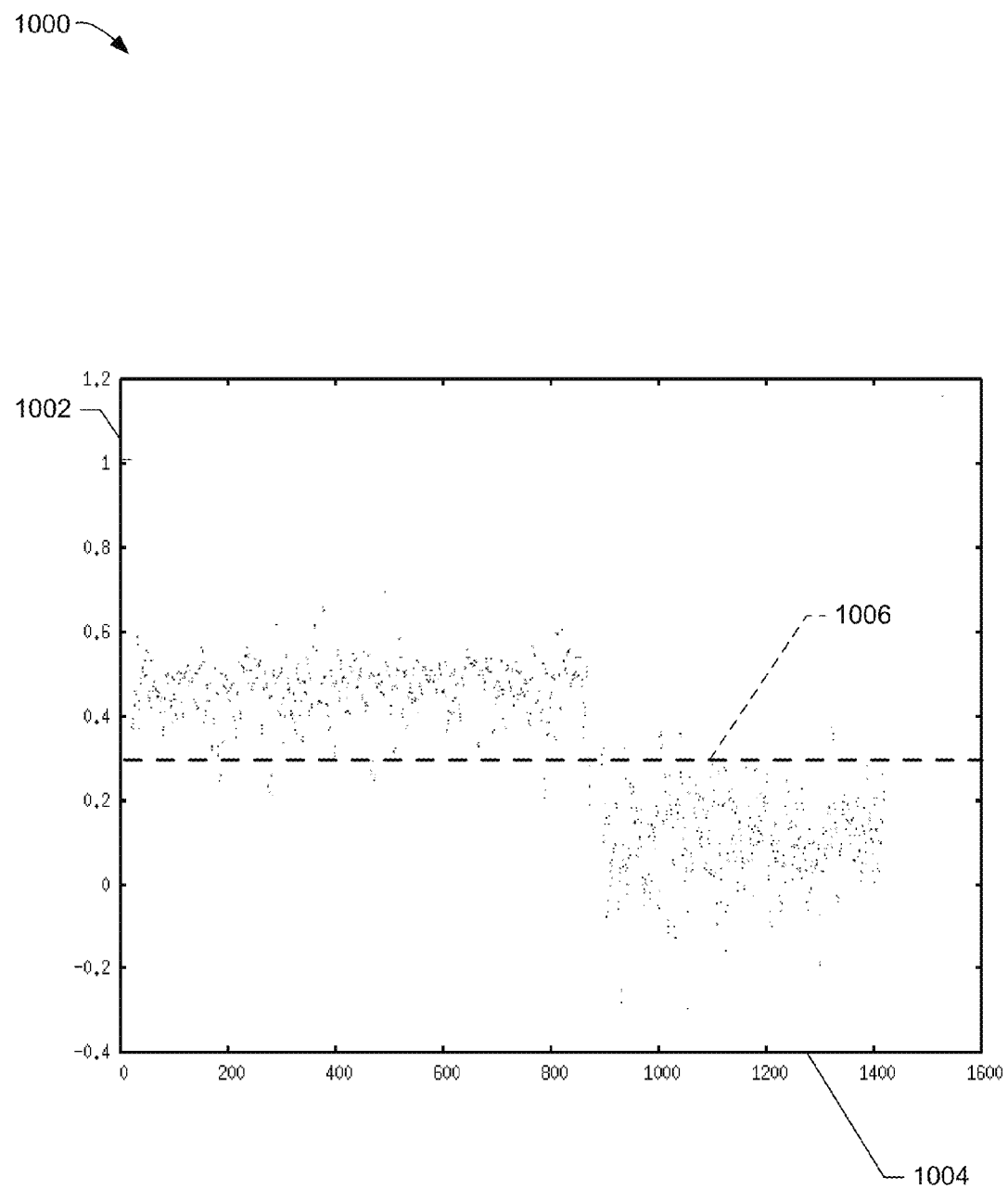
FIG. 10 is a plot of example correlation values indicative of whether the example tag device of FIG. 2 is inside or outside.

In the illustrated examples of Equations 2 and 3, the normalized tag volume ($T_v$), the normalized reference volume ($R_v$) and the correlation values ($C_s$) are applied to various degrees of ordered polynomials. Constants ($B_1, B_2, \ldots, B_n$) are determined by using least-squares fitting and, when applied to example Equation 2, yield the inside/outside correlation score ($C_{score}$). Based on (a) the type of tag 102A, 102B hardware, base unit 110 hardware, normalized tag volume ($T_v$), normalized reference volume ($R_v$), and the correlation values ($C_s$), a threshold inside/outside correlation value may be established to indicate when the example tag 102A, 102B is inside or outside the example area 101, as shown in FIG. 10. While the examples described herein employ a polynomial and least-squares fitting to identify inside/outside correlation values ($C_{score}$'s), the methods and apparatus described herein may also employ a Naïve Bayes Theorem as described in co-pending U.S. patent application Ser. No. 12/263,150 filed on Oct. 31, 2008, entitled "Probabilistic Methods and Apparatus to Determine the State of a Media Device," and is hereby incorporated herein by reference in its entirety.

In the illustrated example of FIG. 10, a plot of inside/outside correlation scores ($C_{score}$'s) 1000 include a y-axis 1002, an x-axis 1004 and a threshold correlation value 1006. The example y-axis 1002 represents individual inside/outside correlation score values ($C_{score}$) at corresponding data points of the x-axis 1004. Data points of the x-axis 1004 represent stored data samples having a normalized tag volume ($T_v$), a normalized reference volume ($R_v$), and a correlation value ($C_s$) for a given tag 102A, 102B and base unit 110 pair. The example correlation engine 318 and/or the processor 302 identifies the threshold correlation value 1006 based on the plurality of inside/outside correlation scores ($C_{score}$'s) 1000, which, in the illustrated example of FIG. 10, resides around 0.28. In operation, an inside/outside correlation score ($C_{score}$) above 0.28 is indicative of the tag 102A, 102B residing inside the example area 101 when a data sample is stored, and an inside/outside correlation score ($C_{score}$) below 0.28 is indicative of the tag 102A, 102B residing outside the example area 101 when a data sample is stored.

Figure 11:
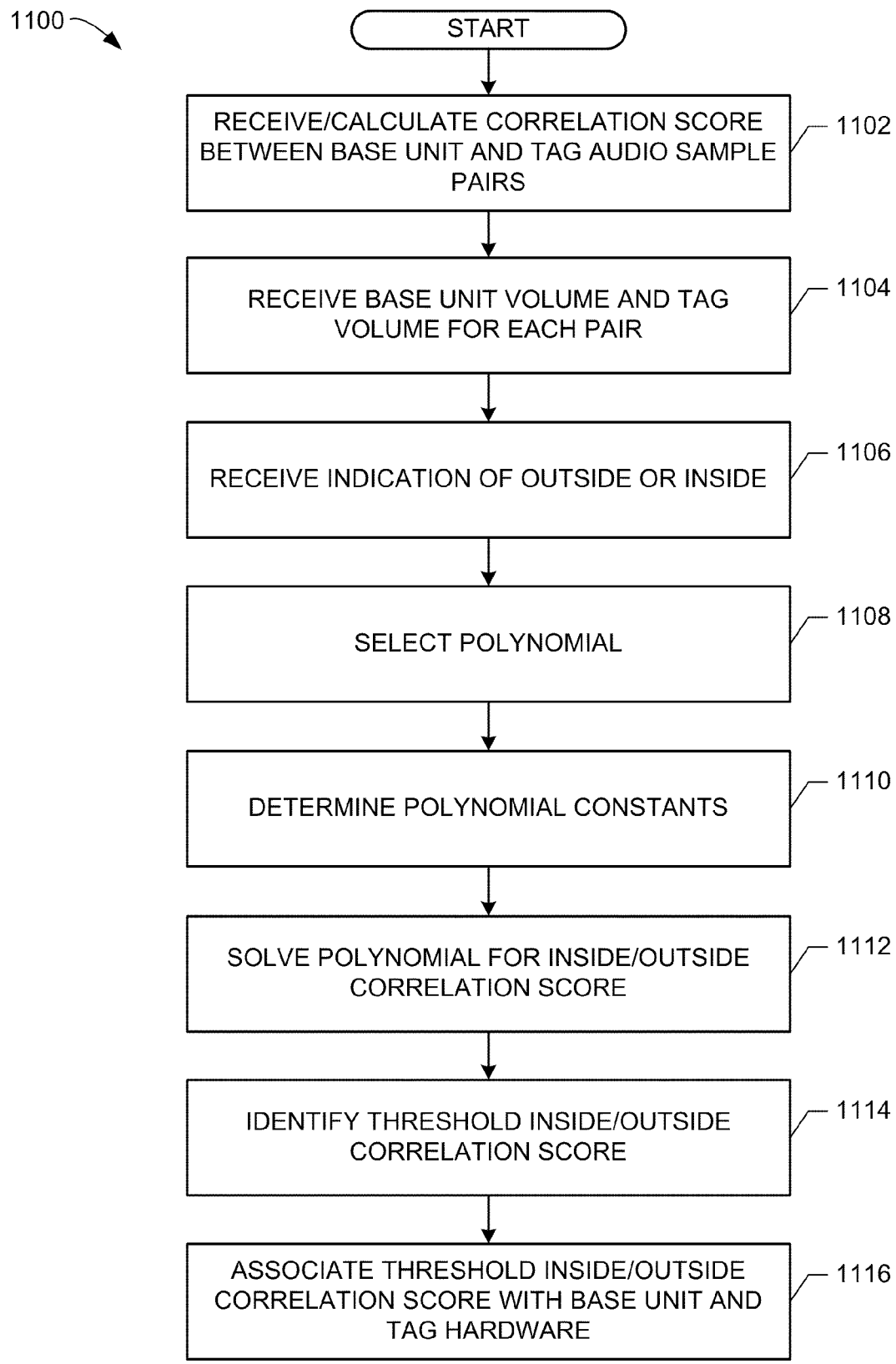

FIG. 11 illustrates an example process 1100 to train base unit 110 and tag 102A, 102B hardware to identify whether the tag 102A, 102B is inside or outside the example area 101 when the data samples are stored. In the illustrated example of FIG. 11, the process 1100 begins by receiving or calculating a correlation score of pairs of audio sequences between the base unit 110 and a tag 102A, 102B (block 1102), as described above in connection with FIGS. 7D and/or 8. The example correlation engine 318 may store the correlation scores in the example memory 304. Additionally, the example correlation engine 318 receives an indication of the base unit 110 volume and an indication of the tag 102A, 102B volume (block 1104), which may be initially represented as a decibel level, a voltage level, etc. The example indications of volume may further be normalized to allow numeric processing, such as normalizing a voltage level to reside within a decimal boundary between zero and one. Each received pair of audio sequences is also associated with an indication of whether the tag 102A, 102B is inside or outside the example area 101 during training (block 1106).

An example polynomial is selected to model the collected and/or otherwise calculated correlation scores (block 1108), such as a fourth-order polynomial. Constants for the example polynomial may be determined via least-squares fitting (block 1110) and, using the normalized base unit 110 volume, the normalized tag 102A, 102B volume, the indication of whether the tag 102A, 102B was inside or outside when the respective data samples were stored, and the correlation scores, the polynomial is solved to obtain inside/outside correlation score values (block 1112). The example inside/outside correlation scores may be calculated in a manner described above in connection with Equations 1 and/or 2. Inside/outside correlation scores may be further analyzed to identify threshold inside/outside correlation score values indicative of inside or outside (block 1114), such as the example threshold 1006 shown in FIG. 10. The threshold inside/outside correlation score value in the illustrated example of FIG. 10 is empirically determined in connection with the specific base unit 110 hardware and tag 102A, 102B hardware. The threshold inside/outside correlation score value may be stored with the specific hardware configuration used so that future instances of calculating the inside/outside correlation score may be compared against the threshold value to identify whether the tag 102A, 102B is inside or outside the example area 101 (block 1116).

Figure 12:
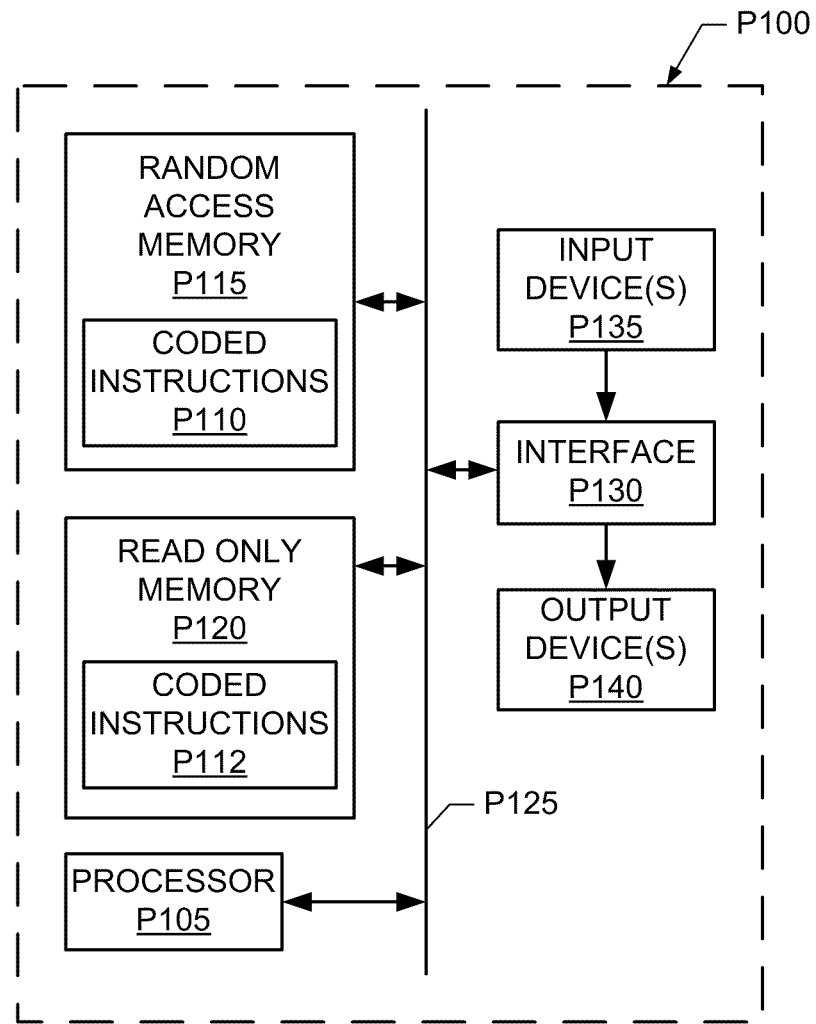
FIG. 12 is a schematic illustration of an example processor platform that may execute the instructions of FIGS. 5, 6 and 7A to implement any or all of the example methods, systems, and apparatus described herein.

FIG. 12 is a schematic diagram of an example processor platform P100 that may be used and/or programmed to implement any or all of the example tag distance calculation system 100, the example tags 102A, 102B, the example media delivery center 106, the example base unit 110, the example central facility 112, the example server 116, the example database 118, the example processor 202, the example memory 204, the example timer/counter 206, the example audio sensor 208, the example RF transmitter 210, the example processor 302, the example memory 304, the example sensors/transducers 306, the example RF interface 308, the example ultrasonic transceiver 310, the example optical sensor/transmitter 312, the example correlation engine 318 and/or the example audio transducer 314 of FIGS. 1-6. For example, the processor platform P100 can be implemented by one or more general-purpose processors, processor cores, microcontrollers, etc.

The processor platform P100 of the example of FIG. 12 includes at least one general-purpose programmable processor P105. The processor P105 executes coded instructions P110 and/or P112 present in main memory of the processor P100 (for example, within a RAM P115 and/or a ROM P120). The processor P105 may be any type of processing unit, such as a processor core, a processor and/or a microcontroller. The processor P105 may execute, among other things, the example processes of FIGS. 5-7A to implement the example methods and apparatus described herein.

The processor P105 is in communication with the main memory (including a ROM P120 and/or the RAM P115) via a bus P125. The RAM P115 may be implemented by dynamic random access memory (DRAM), synchronous dynamic random access memory (SDRAM), and/or any other type of RAM device, and ROM may be implemented by flash memory and/or any other desired type of memory device. Access to the memory P115 and the memory P120 may be controlled by a memory controller (not shown).

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to calculate a distance between a portable audio collecting device and a reference audio collecting device, comprising:
receiving, at the reference audio collecting device, a first radio frequency (RF) signal from the portable audio collecting device to cause the reference audio collecting device to begin storing a plurality of reference data samples, each of the reference data samples associated with an indication of a respective time of acquisition;
receiving, at the reference audio collecting device, a second RF signal containing a plurality of embedded portable data samples of ambient audio collected at the portable audio collecting device, the embedded portable data samples being offset from the reference data samples by a dwell period, the dwell period to prevent collection and storage of portable data samples at the portable audio collecting device that are lacking an overlap parity with the reference data samples collected at the reference audio collecting device, wherein each of the portable data samples is associated with an indication of a respective time of acquisition;
selecting a set of the portable data samples having a highest relative correlation value to a set of reference data samples;
subtracting the indication of times of respective pairs of the selected sets of samples to form a difference value; and
calculating a distance between the portable audio device and the reference audio collecting device based on the difference value.

2. A method as described in claim 1, wherein each indication of the respective time of acquisition corresponds to an integer number of collected data samples.

3. A method as described in claim 2, wherein each integer number of collected data samples is separated by a known duration.

4. A method as described in claim 2, wherein the data samples are collected at a constant data acquisition frequency.

5. A method as described in claim 1, further comprising searching for a threshold increase among the correlation values calculated for sets of the portable data samples and the reference data samples.

6. A method as described in claim 5, wherein the threshold increase among the correlation values is indicative of overlap between the reference data samples and the portable data samples.

7. A method as described in claim 1, wherein the indication of the respective time of acquisition associated with each of the plurality of data samples is based on a number of data samples from the first RF signal.

8. A method as described in claim 7, wherein the indication of the respective time of acquisition associated with the portable data samples is based on an integer value having a constant delay value.

9. A method as described in claim 8, wherein the constant delay value is measured from the first RF signal.

10. A method as described in claim 1, wherein the highest relative correlation value identifies a match between ambient audio stored by the reference audio collecting device and the portable audio collecting device.

11. An apparatus to calculate a distance between a portable audio collecting device and a reference audio collecting device, comprising:
a radio frequency (RF) interface to receive an initialization signal from the portable audio collecting device to cause the reference audio collecting device to begin storing a plurality of data samples;
a processor to associate each of the reference data samples with an indication of a respective time of acquisition; and
a correlation engine configured to:
identify a highest relative correlation value associated with portable data samples
associated with ambient audio and a set of the reference data samples, the portable data samples offset from the set of reference data samples by a dwell period configured to prevent collection and storage of portable data samples that are lacking an overlap parity with the set of reference data samples collected at the reference audio collecting device,
calculate a difference value between an indication of a time of acquisition of the portable data samples and the set of the reference data samples, and
calculate a distance value based on the difference value.

12. An apparatus as described in claim 11, wherein the processor associates an integer number of collected data samples with the indication of a respective time of acquisition.

13. An apparatus as described in claim 11, wherein the correlation engine searches for a threshold increase of a correlation value to identify the highest relative correlation value.

14. An apparatus as described in claim 13, wherein the correlation engine is to identify an indication of overlap between the reference data samples and the portable data samples in response to the threshold increase of the correlation value.

15. A method to collect ambient audio in a monitored area, comprising:
  transmitting a radio frequency (RF) initialization signal from a portable audio collecting device to cause a reference audio collecting device to begin storing reference data samples associated with ambient audio in the monitored area;
  initiating a dwell period on the portable audio collecting device in response to transmitting the RF initialization signal configured to reduce a number of ambient audio data samples collected by the portable audio collecting device that are lacking an overlap parity with the reference data samples stored by the reference audio collecting device;
  collecting ambient audio in the monitored area as portable data samples for a portable collection duration in response to an expiration of the dwell period; and
  transmitting, to the reference audio collecting device, the portable data samples after the portable collection duration via an RF signal, facilitating correlation calculations between the reference data samples and the portable data samples.

16. A method as described in claim 15, wherein a duration of the dwell period is set based on a size of the monitored area.

17. A method as described in claim 16, further comprising dividing a length or width of the monitored area by the speed of sound to calculate the duration of the dwell period.

18. A method as described in claim 15, further comprising decimating the portable data samples before transmitting the portable data samples to the reference audio collecting device.

19. A method as described in claim 18, wherein decimating the portable data samples comprises applying a scale factor to the portable data samples.

20. A machine accessible storage device or storage disk having instructions stored thereon that, when executed, cause a machine to, at least:
  receive, at a reference audio collecting device, a first radio frequency (RF) signal from a portable audio collecting device to cause the reference audio collecting device to begin storing a plurality of reference data samples, each of the reference data samples associated with an indication of a respective time of acquisition;
  receive a second RF signal containing a plurality of embedded portable data samples of ambient audio collected at the portable audio collecting device, the embedded portable data samples being offset from the reference data samples by a dwell period, the dwell period configured to prevent collection and storage of portable data samples at the portable audio collecting device that are lacking an overlap parity with the reference data samples collected at the reference audio collecting device, wherein each of the portable data samples associated with an indication of a respective time of acquisition;
  select a set of the portable data samples having a highest relative correlation value to a set of reference data samples;
  subtract the indication of times of respective pairs of the selected sets of samples to form a difference value; and
  calculate a distance between the portable audio device and the reference audio collecting device based on the difference value.

21. A machine accessible storage device or storage disk as described in claim 20 having instructions stored thereon that, when executed, cause a machine to assign each indication of the respective time of acquisition as an integer number of collected data samples.

22. A machine accessible storage device or storage disk as described in claim 20 having instructions stored thereon that, when executed, cause a machine to search for a transition between a negative correlation value and a positive correlation value to identify the highest relative correlation value.

23. A machine accessible storage device or storage disk as described in claim 20 having instructions stored thereon that, when executed, cause a machine to search for a threshold increase among the correlation values calculated for sets of the portable data samples and the reference data samples.

24. A machine accessible storage device or storage disk as described in claim 20 having instructions stored thereon that, when executed, cause a machine to identify the highest relative correlation value as a match between ambient audio stored by the reference audio collecting device and the portable audio collecting device.

25. A machine accessible storage device or storage disk as described in claim 20 having instructions stored thereon that, when executed, cause a machine to compute the correlation value via at least one of a normalized correlation, a Pearson correlation or a rank correlation.

* * * * *